(12) United States Patent
Maret

(10) Patent No.: US 12,515,759 B2
(45) Date of Patent: Jan. 6, 2026

(54) FRONT SUSPENSION RESTRAINT DEVICE HAVING CROSS BRACE

(71) Applicant: Tamer Billet MX Inc., Lincoln, NE (US)

(72) Inventor: Kevin Maret, Lincoln, NE (US)

(73) Assignee: Tamer Billet MX Inc.

(*) Notice: Subject to any disclaimer, the term of this patent is extended or adjusted under 35 U.S.C. 154(b) by 555 days.

(21) Appl. No.: 18/055,396

(22) Filed: Nov. 14, 2022

(65) Prior Publication Data
US 2023/0150607 A1 May 18, 2023

Related U.S. Application Data

(60) Provisional application No. 63/279,244, filed on Nov. 15, 2021.

(51) Int. Cl.
*B62K 25/08* (2006.01)
*B62K 11/02* (2006.01)
*B62K 25/04* (2006.01)

(52) U.S. Cl.
CPC .............. *B62K 25/08* (2013.01); *B62K 11/02* (2013.01); *B62K 2025/047* (2013.01)

(58) Field of Classification Search
CPC ........ B62K 25/08; B62K 25/06; B62K 25/10; B62K 11/02; B62K 2025/047
See application file for complete search history.

(56) References Cited

U.S. PATENT DOCUMENTS

| | | |
|---|---|---|
| 3,989,261 A | 11/1976 | Kawaguchi |
| 4,572,534 A | 2/1986 | Heyl |
| 4,609,202 A | 9/1986 | Miyakoshi |
| 4,735,276 A | 4/1988 | Burton |
| 4,884,842 A | 12/1989 | Finkelstein |
| 5,022,501 A | 6/1991 | Hayashi |
| 5,044,592 A | 9/1991 | Cienfuegos |
| 5,344,170 A | 9/1994 | Ochoa |
| 5,509,674 A | 4/1996 | Browning |
| 6,202,971 B1 | 3/2001 | Duncan |

(Continued)

OTHER PUBLICATIONS

"10 Hidden Secrets of Speed, Holeshot Devices, The Best 50 Feet of Your Life," Advertisement, 2 pages (Feb. 2002).

(Continued)

*Primary Examiner* — John D Walters
(74) *Attorney, Agent, or Firm* — 24Hour IP, PLC

(57) ABSTRACT

A suspension restraint device can be used for releasably locking a front fork of a motorcycle. The suspension restraint device can include a hold down component and a cross member. The hold down component can include a hold down base and a plurality of a biased retention members (e.g., spring-loaded latching pin assemblies) received within the hold down base, the hold down base extending in a first direction. The cross member can be mounted to the hold down component between a corresponding pair of biased retention assemblies, the cross member extending in a second direction different than the first direction. The cross member and the hold down component can be configured to be further mounted to a motorcycle plastic component. At least one given biased retention assembly can be configured to releasably lock relative to the front fork of the motorcycle.

20 Claims, 15 Drawing Sheets

(56) References Cited

U.S. PATENT DOCUMENTS

| | | | |
|---|---|---|---|
| 6,354,557 B1 | 3/2002 | Walsh | |
| 7,051,852 B2* | 5/2006 | Maret | F16F 9/58 |
| | | | 188/300 |
| 8,727,081 B2* | 5/2014 | Phipps | B62K 25/08 |
| | | | 188/300 |
| 9,394,963 B2 | 7/2016 | Phipps | |
| 10,088,008 B2 | 10/2018 | Groebner | |
| 11,286,016 B2* | 3/2022 | Smith | B62K 25/08 |
| 11,866,119 B2* | 1/2024 | Berger | B62K 25/08 |

OTHER PUBLICATIONS

"Ask Us Anything, We've Got the Answer," Advertisement by Racerxill, 1 page (Feb. 2002).

"Fastbreak Launch System" Advertisement by Motovation Racing Products, 1 page (Feb. 2002).

"Kickstart, Locked and Loaded," Advertisement, 1 page (Oct. 2001).

"Inside Line, DR Tested, ProCircuit Launch Control," Advertisement by ProCircuit, 1 page (Feb. 2002).

"Changing the Weight Bias, The Whole Truth About Holeshot Devices," Advertisement from www.motocrossingactionmag.com pp. 28-29 (Feb. 2002).

"Gearhead Heaven, ProCircuit Launch Control Holeshot Device," Advertisement from www.motocrossingactionmag.com p. 34 (Feb. 2002).

"Tear Offs" Pro Circuit Advertisement, 1 page (Feb. 2002).

"Factory Secret Revealed," Advertisement by Works Connection, 2 pages (Feb. 2002).

New Product, Launch Control Advertisement, 1 page (Feb. 2002).

Atomic22 Holeshot Device Advertisement, 1 page (Feb. 2002).

Improve Holeshot Performance by Mx ProWay Advertisement, 1 page (Feb. 2002).

Holeshot Hookup by TamerUSA Installation Instructions, 1 page (on or about 2005).

Tamer Billet MX Holeshot Hookup by Tamer Billet MX, Advertisement (on or about 2005).

\* cited by examiner

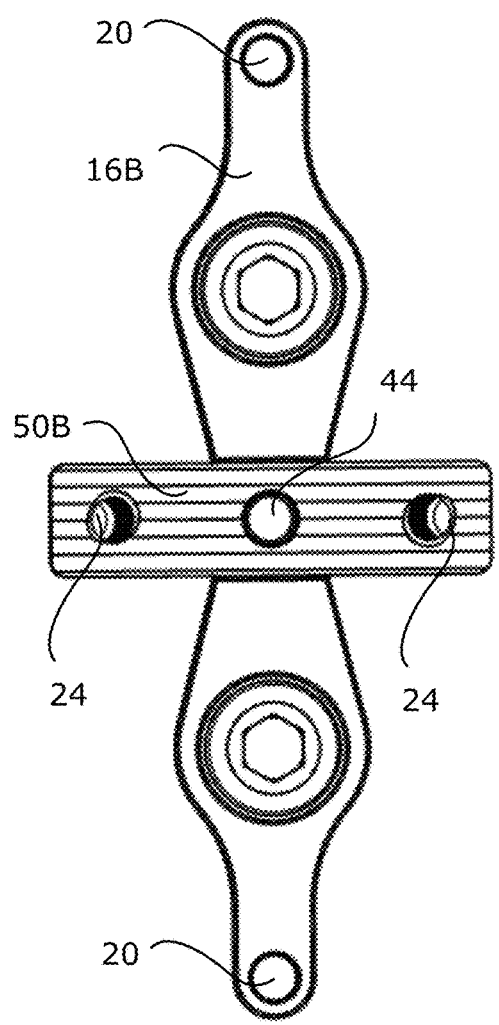
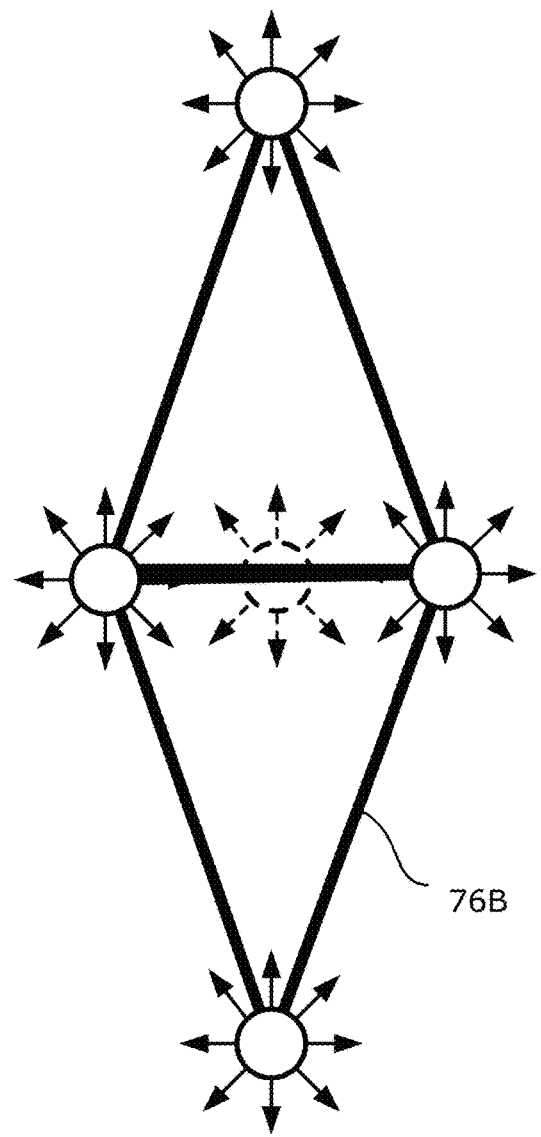
*Fig. 5B*  *Fig. 5C*

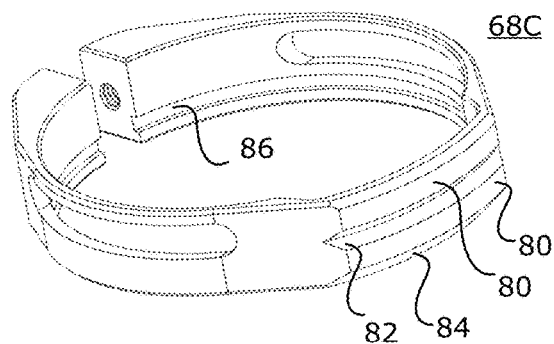
Fig. 7A
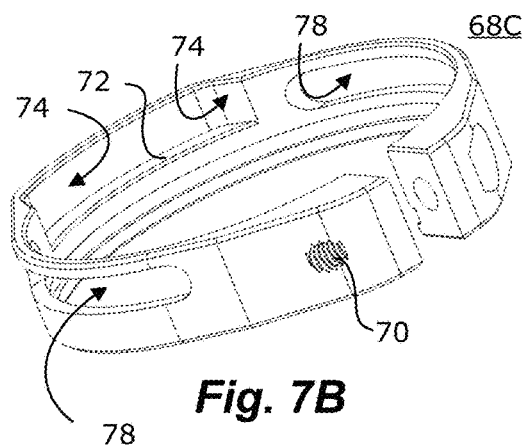
Fig. 7B
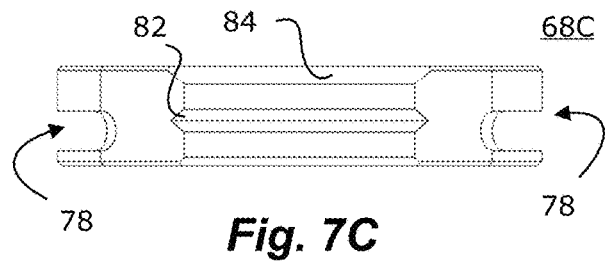
Fig. 7C
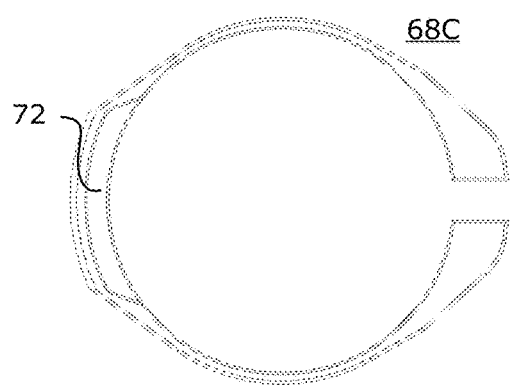
Fig. 7G
Fig. 7D
Fig. 7E
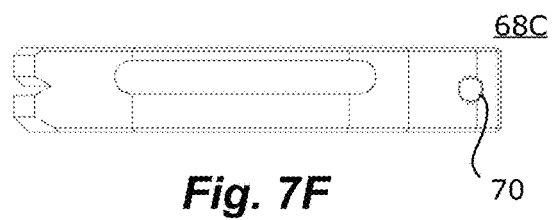
Fig. 7F
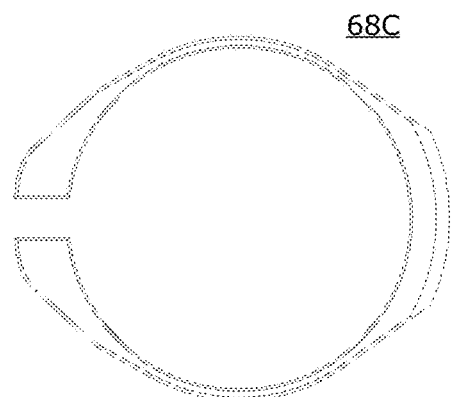
Fig. 7H

FRONT SUSPENSION RESTRAINT DEVICE HAVING CROSS BRACE

This application claims the priority benefit of U.S. Provisional Patent Application No. 63/279,244, filed Nov. 15, 2021, which application is hereby incorporated by reference in its entirety.

BACKGROUND

Technical Field

The present disclosure generally relates to improved performance in motocross. More particularly, but not exclusively, the present disclosure relates to means of keeping the front tire of a motocross motorcycle from undesirably rising up from the track under certain conditions in a motocross or motocross-style event.

Description of the Related Art

Off-road motorcycle racing, or motocross, often includes a sequence of events where a motocross rider starts from a slow or stopped position and accelerates as quickly as the motorcycle, the conditions, and the rider's skill permit. For example, in motocross head-to-head competition, where a plurality of riders concurrently races to complete a defined number of loops around a track, all of the riders begin the race at a wide, flat starting area in a side-by-side starting orientation. At the commencement of the race, all riders immediately try to aggressively accelerate their motorcycle towards a first turn in the track. Being the first rider through the apex of the first turn gives the rider first position (i.e., "first place") in the race, which is advantageous to winning the race. In alternative cases where a motocross or motocross-style event is a timed race rather than a head-to-head competition, each rider individually begins from a starting gate, but each rider still aggressively accelerates the motorcycle towards the first turn in the track to reach the apex of the first turn in the shortest possible time.

It is known that aggressively accelerating a motorcycle from a stopped position urges the front wheel of the motorcycle upwards and off the ground (i.e., a "wheelie"), which makes steering and otherwise controlling the motorcycle more difficult. As the front tire rises, the motorcycle also encounters more wind resistance, which inhibits the motorcyclist's ability to accelerate. If the rider continues to accelerate the motorcycle aggressively, the front wheel may rise far enough to shift the rider and motorcycles center of gravity sufficiently rearward to cause a complete loss of control and a crash.

In general, when a rider leaves the starting area (e.g., starting gate) in a motocross event or practice, the throttle of the motorcycle is aggressively moved toward a wide-open position, and concurrently, the clutch of the motorcycle is aggressively released (e.g., dumped) to accelerate the motorcycle as quickly as possible, which can cause the front of the motorcycle to rise into a wheelie. To prevent the wheelie, or to reduce its undesirable effects, the rider will often manipulate the throttle to control the front end of the motorcycle. Such manipulation is often accomplished by backing off the throttle slightly but backing off the throttle also requires sacrificing potential or actual speed.

As a solution to this "wheelie" problem, it is known to temporarily lock down the front fork of the motorcycle using a simple hook interfacing with a corresponding hole in one of the motorcycle's plastic fork guards. While this practice is effective at lowering the center of gravity of the rider and motorcycle, and permitting higher speed before starting a wheelie, the setup is often unacceptable for various reasons. One such reason is from the perspective of wear-and-tear on the fork guard. Such wear-and-tear can include abrasion (e.g., rubbing or scoring along the length of the fork guard) caused when the hook, which is often hardened metal, contacts the fork guard during a motocross event. Wear-and-tear from the simple hook can also include compressive damage to the opening created in the fork guard where the hook engages to hold down the front wheel. Yet one more reason that the simple hook setup might be unacceptable is the potential for inadvertent engagement of the hook during an event since the hook remains jutting outward after its desirable disengagement from a fork guard.

Other technologies have also been tried to solve the "wheelie" problem. Some aspects of technologies and related art that may be useful in understanding the background of the present disclosure are described in the following publications:

U.S. Pat. No. 7,051,852 B2 to Maret, which is entitled, "SUSPENSION RESTRAINT DEVICES" teaches a starting device to help hold the front end down of a motorcycle to the ground, especially in a "hole shot" or starting application. Generally, this goal is accomplished by a rider compressing the suspension fork of the motorcycle down by about 3 to about 4 inches and pushing in a spring-loaded lock button while the fork struts are compressed so as to lock an interface member associated with the push button onto or into an interface member mounted on the fork. The fork interface member may be a ring clamped to the fork. Alternatively, the fork interface member may be a feature integrated with the fork.

Once locked, it becomes difficult to wheelie the motorcycle off the start while holding the throttle wide open. When the rider dives into the first corner of a racetrack and applies the front brake to slow down, the braking action compresses the forks slightly, which drives the ring or other fork interface member towards the ground, releasing the lock interface member. This release causes the spring-loaded push button to return back to its unlocked position thereby providing clearance between the interface members and allowing the rider the full range of available suspension for the remainder of the race.

U.S. Pat. No. 8,727,081 B2 to Phipps, which is entitled, "MOTORCYCLE FORK RESTRAINT DEVICE," teaches a restraint device that employs one or more magnets that bias a restraint device toward a released or retracted position. The magnet(s) develop all or substantially all of the biasing force tending to move the restraint device toward the released or retracted position. That is, preferably, other biasing elements, such as the springs often used in restraint devices, are omitted. Particularly, Phipps discovered that a magnetic-based retraction or release mechanism provides reliable operation and longevity of the restraint device and allows a motorcycle rider to set the device without assistance.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

The following is a summary of the present disclosure to provide an introductory understanding of some features and context. This summary is not intended to identify key or critical elements of the present disclosure or to delineate the scope of the disclosure. This summary presents certain concepts of the present disclosure in a simplified form as a prelude to the more detailed description that is later presented.

The device, method, and system embodiments described in this disclosure (i.e., the teachings of this disclosure) provide an improved suspension restraint system for motorcycles. A fork ring has been improved with various features including some optional features, and the structures that hold or otherwise contain one or more latching pins have been improved to enable better performance and longer life of the restraint system.

In a first embodiment, an improved suspension restraint system to releasably lock a front fork of a motorcycle includes a fork ring arranged to receive a latching pin when the fork ring is coupled or integrated with the front fork of the motorcycle; a hold down component including a hold down base and at least one latching pin received within the hold down base, the hold down base extending in a first direction; and a cross member united with the hold down component, the cross member extending in at least a second direction different than the first direction, the cross member and the hold down component configured to be further mounted to a fork guard of the motorcycle by a plurality of fasteners positioned at vertices of a separation of stress pattern that extends from a center point of the fork guard in the first and second directions, the cross member located proximate the at least one latching pin, a respective portion of the latching pin configured to selectably travel through the motorcycle fork guard and releasably lock into the fork ring.

In some cases of the first embodiment, a given latching pin is a spring-loaded pin assembly. In these and other cases, the separation of stress pattern is a triangular separation of stress pattern or a dual triangular separation of stress pattern. Sometimes, the fork ring includes a wear indicator. In cases where the fork ring includes a wear indicator, the wear indicator may include a colored finish; a wear indicator face; and a wear indicator groove. Alternatively, or in addition, the wear indicator may include at least one threaded member.

In some cases of the first embodiment, the fork ring further includes a shaped surface on at least a portion of its lower boundary. In these or other cases, the fork ring includes one or more flex structures arranged to increase an opening capacity of the fork ring. The cross member of an improved suspension restraint system may include at least one concave surface and additionally, or alternatively, at least one binding profile.

In a second embodiment, an improved suspension restraint device to releasably lock a front fork of a motorcycle includes: a hold down component including a hold down base and at least one latching pin received within the hold down base, the hold down base extending in a first direction; and a cross member united with the hold down component, the cross member extending in at least a second direction different than the first direction, the cross member and the hold down component configured to be further mounted to a motorcycle fork guard by a plurality of fasteners positioned at vertices of a separation of stress pattern that extends from a center point of the fork guard in the first and second directions, the cross member located proximate the at least one latching pin, a respective portion of the latching pin configured to selectably travel through the motorcycle fork guard and releasably lock relative to the front fork of the motorcycle.

In some cases of the second embodiment, a given latching pin is a spring-loaded pin assembly, and in some cases, the separation of stress pattern is a triangular separation of stress pattern or a dual triangular separation of stress pattern. Sometimes, a given latching pin has at least one gently shaped edge, and sometimes, the improved suspension restraint device has exactly one latching pin.

In a third embodiment, an improved motorcycle suspension restraint method includes: compressing a motorcycle's front forks down a path of travel by a first amount, the motorcycle's front forks bearing a fork ring arranged to receive a latching pin, the first amount being sufficient to advance the fork ring below the latching pin; advancing the latching pin at least partially into the path of travel, wherein the latching pin is contained in a hold down base of an improved suspension restraint device, the hold down base extending in a first direction, the improved suspension restraint device further having a cross member united with the hold down component, the cross member extending in at least a second direction different than the first direction; releasing the motorcycle's front forks up the path of travel less than the first amount until at least a portion of the latching pin is temporarily held in place by at least a portion of the fork ring; and sustaining pressure in a fork guard from tension caused by the latching pin being temporarily held in place, the ability to sustain the pressure being enabled at least in part by a plurality of fasteners positioned at vertices of a separation of stress pattern that extends from a center point of the fork guard in the first and second directions, wherein the cross member and the hold down component are mounted to the fork guard of the motorcycle by the plurality of fasteners.

In some cases of the third embodiment, the separation of stress pattern is a triangular separation of stress pattern or a dual triangular separation of stress pattern. In these and other cases of the third embodiment, the improved motorcycle suspension restraint method further includes: accelerating the motorcycle in a condition that would cause a wheelie but for the latching pin being temporarily held in place by at least the portion of the fork ring hold down component; and decelerating the motorcycle sufficiently to cause a compression in the front forks down the path of travel by a second amount, the second amount being sufficient to permit retraction of the latching pin out from the path of travel. Sometimes, the improved motorcycle suspension restraint method further or alternatively includes operating the motorcycle until a wear indicator on the fork ring indicates the fork ring is worn out or nearing a failure point. And in some cases, the improved motorcycle suspension restraint method alternatively or additionally includes: accelerating the motorcycle in a condition that would cause a wheelie but for the latching pin being temporarily held in place by at least the portion of the fork ring hold down component; selecting whether to compress the motorcycle's front forks down the path of travel by the first amount or a second amount; and based on the selection, advancing either the latching pin or a second latching pin into the path of travel.

These features with other objects and advantages that will become subsequently apparent reside in the details of construction and operation as more fully described hereafter and claimed, reference being had to the accompanying drawings forming a part hereof.

This Brief Summary has been provided to describe certain concepts in a simplified form that are further described in more detail in the Detailed Description. The Brief Summary does not limit the scope of the claimed subject matter, but rather the words of the claims themselves determine the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIG. 5B is a front-side elevation view of the hold down base and cross member of the improved restraint device system embodiment of FIG. 5A;

FIG. 5C is a separation of stress schematic representative of the improved restraint device system embodiment of FIGS. 5A-5B;

FIG. 7A is a top, front-side isometric view of an exemplary fork ring;

FIG. 7B is a top, back-side isometric view of the exemplary fork ring of FIG. 7A;

FIG. 7C is a front-side elevation view of the exemplary fork ring of FIG. 7A;

FIG. 7D is a right-side elevation view of the exemplary fork ring of FIG. 7A;

FIG. 7E is a back-side elevation view of the exemplary fork ring of FIG. 7A;

FIG. 7F is a left-side elevation view of the exemplary fork ring of FIG. 7A;

FIG. 7G is a top-side elevation view of the exemplary fork ring of FIG. 7A;

FIG. 7H is a bottom-side elevation view of the exemplary fork ring of FIG. 7A;

In the present disclosure, for brevity, certain sets of related figures may be referred to as a single, multi-part figure to facilitate a clearer understanding of the illustrated subject matter. For example, FIGS. 1A-1C may be individually or collectively referred to as FIG. 1. FIGS. 2A-2B may be individually or collectively referred to as FIG. 2. FIGS. 4A-4E may be individually or collectively referred to as FIG. 4. FIGS. 5A-5E may be individually or collectively referred to as FIG. 5. FIGS. 6A-6H may be individually or collectively referred to as FIG. 6. FIGS. 7A-7H may be individually or collectively referred to as FIG. 7. And FIGS. 8A-8B may be individually or collectively referred to as FIG. 8. Structures earlier identified are not repeated for brevity.

DETAILED DESCRIPTION

Figure 1A:
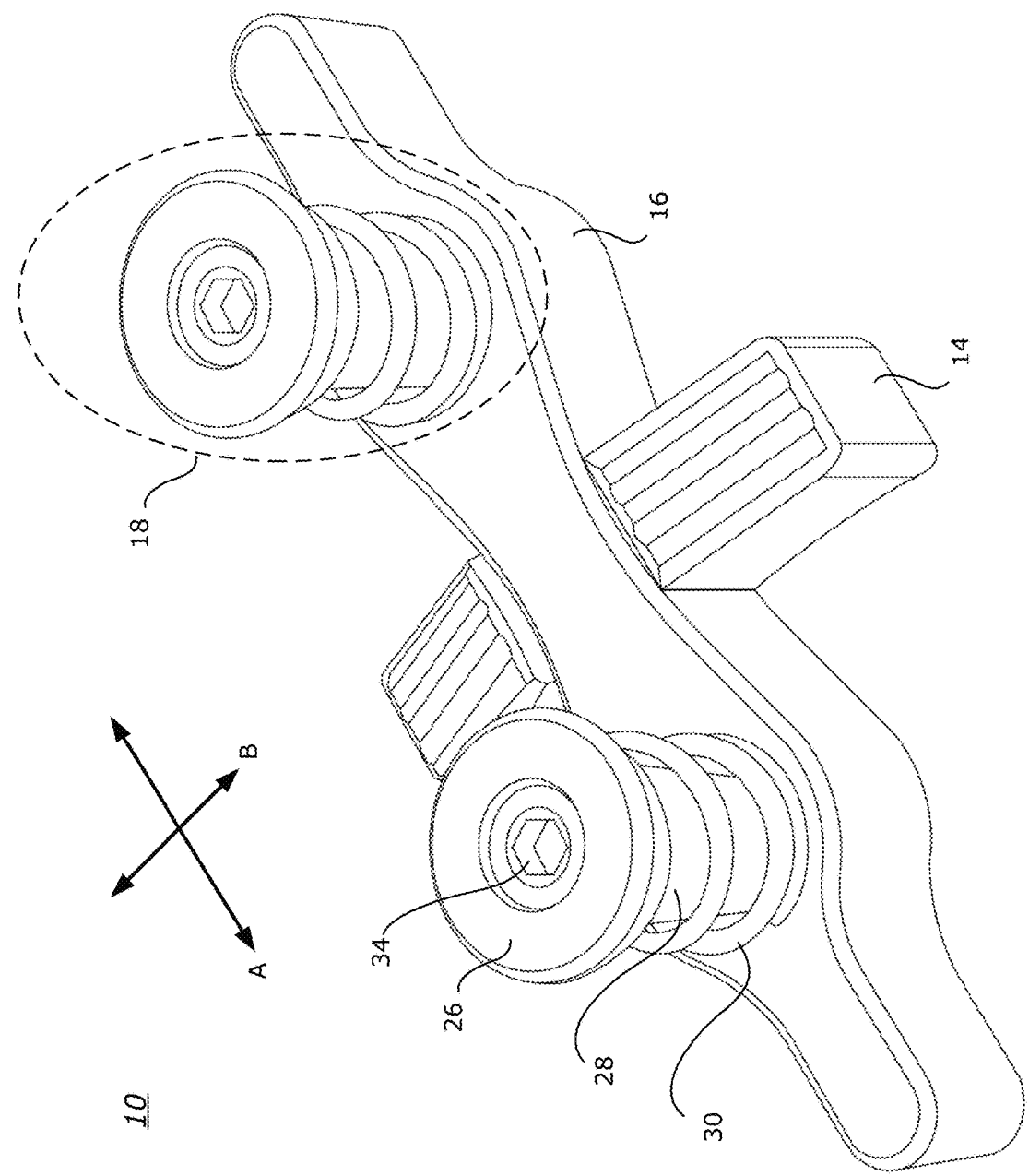
FIG. 1A is a top, isometric view of an improved suspension restraint device in accordance with an embodiment of the present disclosure.

The present disclosure may be understood more readily by reference to this detailed description and the accompanying figures. The terminology used herein is for the purpose of describing specific embodiments only and is not limiting to the claims unless a court or accepted body of competent jurisdiction determines that such terminology is limiting. Unless specifically defined in the present disclosure, the terminology used herein is to be given its traditional meaning as known in the relevant art.

In the following description, certain specific details are set forth i to provide a thorough understanding of various disclosed embodiments. One skilled in the relevant art, however, will recognize that embodiments may be practiced without one or more of these specific details, or with other methods, components, materials, etc. Also in these instances, well-known structures may be omitted or shown and described in reduced detail to avoid unnecessarily obscuring more detailed descriptions of the embodiments.

Prior to setting forth the embodiments however, it may be helpful to an understanding thereof to first set forth definitions of certain terms that are used hereinafter.

The terms, "suspension restraint device," "starting device," and "holeshot device" are used interchangeably throughout the present specification and claims to refer to structures that help hold the front end of a motorcycle down closer to the ground than the front end would normally be in a steady-state. Improved suspension restraint devices include structures that improve the operations of known suspension restraint devices. Embodiments of improved suspension restraint devices are described in the present disclosure, illustrated in the present figures, and limited only by the recitations in the present claims.

"Fork guards," "fork protectors," "fenders," and other like terms are structural elements arranged to protect the front forks and other periphery structures of a motorcycle from dirt, mud, sand, rocks, and other debris. A motorcycle fork couples a motorcycle's front wheel and axle to its frame. In at least some cases, a motorcycle fork is comprised of two or more coaxial (e.g., telescoping) cylinders or other such tube-like structures that mate under tension to provide suspension, shock absorption, and other desirable properties. Periphery structures of motorcycle forks may include clamps, brake components, shims, seals, fastening means, and other components. Fork guards may be formed of plastic, metal, a composite material, or any other suitable substance. In many cases, fork guards are acceptably durable and functionally pliable to deform and/or absorb impact shock caused by debris proximate the motorcycle's front wheel during operation.

A "fork ring" is a structure coupled to, or integrated with, the front fork structure of a motorcycle that facilitates a temporary hold-down of the motorcycle's front forks in a compressed state. A fork ring may have a ring- or clamp-like structure arranged to encircle the front fork or forks of a motorcycle. Alternatively, the fork ring may be otherwise arranged for temporary or permanent affixation to the motorcycle by any type of fastener or construction (e.g., bolts, screws, adhesives, welds, and any other such affixation methodology). In some cases, the fork ring is integrated with a front fork structure during time of manufacture. In other cases, a fork ring is an after market device added to a motorcycle after the motorcycle has been manufactured. Accordingly a fork ring as the term is used in the present disclosure is any suitable fork interface member suitable to assist in a method of temporarily holding down the motorcycle's front forks in a compressed state. Without limitation, exemplary fork ring embodiments are illustrated in at least FIGS. 4, 5, 7, and 8. These and other such fork rings cooperate with a latching pin to temporarily maintain a motorcycle's front forks in a compressed state. In addition to facilitating the temporary hold-down of the motorcycle's front forks in a compressed state, exemplary fork rings may have zero or more optional features including, but not limited to, a wear indicator, an open latch area that permits automated or easier removal of debris, window openings that to allow enhanced flexure of the fork ring for easier installation and removal, an inside diameter groove to mate with an original equipment manufacturer's (OEM) steel wear ring, a shaped surface (e.g., a taper, a chamfer, or the like) to deflect a motorcycle's fork guard away from the fork ring during downward travel of the forks, and other features as will become apparent in the present disclosure.

A "latching pin" is a structure coupled to, or integrated with, a motorcycle or parts associated with the motorcycle, that cooperates with a fork ring to facilitate a temporary hold-down of the motorcycle's front forks in a compressed state. A latching pin may have a cylindrical or barrel-like structure arranged to extend into and back from the path of the fork ring as the fork ring travels with the front forks of a motorcycle. Other non-cylindrical shapes are also contemplated. In its steady state, a latching pin is biased out of the travel path of the fork ring, and such biasing may be by way of a spring, a magnet, gravity, or any other biasing means. Alternatively, the latching pin have any other suitable shape or characteristics. Accordingly, a latching pin as the term is used in the present disclosure is any biased retention member suitable to cooperate with a fork ring in a method of temporarily holding down the motorcycle's front forks in a compressed state. Without limitation, exemplary latching pin embodiments are illustrated in at least FIGS. 3, 4, and 5.

The device, method, and system embodiments described in this disclosure (i.e., the teachings of this disclosure) are adapted to provide an improved suspension restraint device. As with conventional suspension restraint devices, the improved suspension restraint devices of the present disclosure are also arranged to help hold the front end of a motorcycle down closer to the ground than the front end would normally be in a steady-state. This "hold-down" condition is useful in many cases, especially in a "hole shot" or starting application. Generally, this hold-down condition can be accomplished by a rider compressing the suspension fork of the motorcycle down between about two inches to about eight inches (2 in. to 8 in.), and in a preferred case, between about three inches to about four inches (3 in. to 4 in.). Considering this configuration, the motorcycle's fork (e.g., compression fork, suspension fork, or another like term), may be formed as two or more cylindrical or otherwise tube-like structures having different diameters or other such dimensions. Based on this construction, these and other motorcycle forks contemplated here can "telescope" in to, or out from, each other under tension of springs, gas, or some other pressure means. After the suspension fork is compressed, the rider or someone else may engage (e.g., push in) one or more biased retention devices (e.g., spring-loaded or magnetically-biased lock/hold down buttons) to lock a first interface member associated with the one or more latching pins (e.g., the spring-loaded or magnetically-biased lock/hold down push buttons) onto or into a second interface member mounted on the fork. The second interface member (e.g., a fork ring or some other fork interface member) may be a ring clamped to the fork in some cases. Alternatively, the second interface member may be a feature integrated with the fork. In some cases, the second interface member includes one or more interface grooves; in other cases, no interface grooves are present.

As time passes, motorcycles are getting more powerful. Additionally, in some instances, the starting line of motorcycle races have changed. At some tracks, for example, steel grate pads have been added behind the starting gate, and these pads provide a lot more traction than dirt. To provide the benefit of known suspension restraint devices, the mounting distances of the latching device are increasing. Stated differently, suspension restraint devices are being mounted further down on the motorcycle plastic fork guard.

Mounting conventional suspension restraint devices lower on the fork guard causes problems. As a result of this increased mounting distance, for example, there is a corresponding increased force on the suspension restraint device or some portion thereof due to the increased pressure of the forks trying to rebound while the starting device or holeshot device is latched. Accordingly, the inventor has recognized that conventional suspension restraint devices or some portion or portions thereof are being pulled out or through the plastic fork guard. Additional problems are created by an inability to clear debris (e.g., dirt, mud, sand, rocks, and the like) from various portions of the conventional suspension restraint devices or to even recognize when various portions of the conventional suspension restraint devices are wearing out.

The present inventor has discovered that one potential solution to the problem of a conventional suspension restraint device or some portion or portions thereof being pulled out or through the fork guard is to distribute the load of the forces being applied in multiple directions. In some cases, this distribution of force may be accomplished by placing mounting structures (e.g., fasteners such as screws, rivets, pins, bolts, or the like) in a non-linear manner. That is, by placing each mounting structure in a way that is not in line with all other mounting structures. Other solutions discovered by the present inventor include embodiments that permit clearing of debris from the improved suspension restraint devices and embodiments of improved wear-recognition features of the improved suspension restraint devices as described in the present disclosure.

In an embodiment, improved suspension restraint devices of the present system further include a hold down component carrying the one or more latching pins (e.g., hold-down buttons or some other biased retention member) and a cross member (e.g., a cross wing member). The first hold down component can be attached, for example, to the motorcycle fork guard with any suitable number of fasteners (e.g., one, two, three, or some other number of screws, rivets, pins, posts, bolts, clasps, weld beads, spot welds, epoxies, or some other mounting structures), which can, in an embodiment, be in line with one another in a first direction. The cross member can be attached to the motorcycle fork guard using two or more additional fasteners in line with one another in a second direction, wherein the second direction is different from the first direction.

In an embodiment, the first direction can be substantially perpendicular to the second direction (e.g., at an angle of 80°-100°; 85°-95°; or 90°±1°). In an embodiment, the first direction can be substantially vertically aligned relative to the motorcycle fork guard (e.g., the height direction of the motorcycle, substantially parallel the motorcycle fork, or by some other description), and the second direction can be substantially horizontal to the motorcycle fork guard.

In another embodiment, the second direction can be at a substantially oblique (i.e., non-orthogonal) alignment relative to the first direction (e.g., 30°, 45°, 60°, or another non-90° angle). The cross member may further be attached to both the hold down component and the motorcycle fork guard by one or more interconnect fasteners associated with the hold down component. The cross member may be centrally mounted relative to the hold down component. In an embodiment, the cross member itself can be a generally linear element or may define a multidirectional shape (e.g., an X-shape member). In an embodiment, the cross member can be releasably attached (e.g., via one or more fasteners) to the hold down component or may be made integral therewith (e.g., metallurgically attached (e.g., welded, soldered, brazed, or otherwise adhered); or co-molded, forged, cast, or the like, as a single piece).

In an embodiment, the cross member of the present improved suspension restraint device facilitates an increased distribution of force (e.g., load spreading) across the motorcycle fork guard, particularly doing so in the first and second directions described herein. Additionally, the additional crosswise contact surface of the cross member relative to the oppositely aligned contact surface of the hold down component can offer greater mechanical stability (e.g., via torque resistance and contact friction) than otherwise available with the hold down component alone. In an embodiment, the load distribution can be aided by having a first set of aligned fasteners (e.g., three vertical screws) and a second set of fasteners (e.g., two or more) that are distinctly aligned (e.g., horizontal or oblique) relative to each other. In an embodiment, a central one of the first set of fasteners may also be aligned with the second set of aligned fasteners, connected to both the hold down component and the cross member.

In an embodiment, the presence of the additional fasteners associated with the cross member distinct from those of the hold-down component (e.g., by way of example only, a total of five fasteners instead of three, with other numbers of fastener groupings being within the scope of this disclosure) can help prevent the improved suspension restraint device or portion or portions thereof from being pulled out of or through the motorcycle fork guard. Otherwise, when only the hold down component and its grouping of fasteners are present (e.g., as with the conventional suspension restraint device disclosed in U.S. Pat. No. 7,051,852, the contents of which is incorporated by reference), particularly when aligned in a single direction, there can be a greater risk of the conventional suspension restraint device being pulled out of or through the motorcycle fork guard.

In an embodiment, the hold down component and the cross member can be mutually notched to promote the connection therebetween (e.g., limit pivoting therebetween; help ensure lateral positioning therebetween) and to yield a substantially continuous surface therebetween relative to the face configured to contact the motorcycle plastic.

In operation of the improved suspension restraint device, once a latching pin is locked in a fork ring, it becomes difficult for the rider to wheelie the motorcycle while advancing or holding the throttle wide open, even when starting from a stopped (e.g., stationary or slow moving) position. When the rider dives (e.g., brakes, aggressively releases the throttle, posts a foot, or otherwise slows down) into the first corner of a racetrack, the braking or otherwise slowing action compresses the forks, slightly driving fork ring or other fork interface portion towards the ground, and this temporarily increased fork compression releases the lock interface member. Upon release of tension between the interface ring and the lock interface member, the biased retention member (e.g., a spring-loaded (e.g., via a coil spring, spring steel member, or some other spring) or magnetically biased push button, or the like) to pop back, providing clearance between the interface members, thereby allowing the rider the full range of available suspension for the remainder of the race.

In an embodiment, a plurality of separately engageable push buttons (e.g., two) are incorporated in a single lockdown device. Alternately, or additionally, the fork ring or other fork interface member may include a plurality of engagement positions or multiple fork-side engagement members. However configured, such provisions allow a rider to choose the latching pin (e.g., button or some other biased retention member) and/or fork interface position that is acceptable for given track conditions.

As conditions change throughout the day, a rider might choose to select a setup with a different degree of fork compression and temporary lockdown. For example, with a two-position (e.g., via upper and lower buttons) device, if the conditions are tacky in the first moto, then the rider can choose the lower position. If the conditions dry out throughout the racing day, the rider can use the upper position for the second moto. If the start area is concrete or metal grate, then the rider can use the upper position all the time or use no lockdown at all. The rider can easily try both positions before each moto and see which is acceptable without switching fork guards and/or purchasing extra improved suspension restraint devices. Devices having more than two positions or fewer than two positions are also contemplated.

Figure 1B:
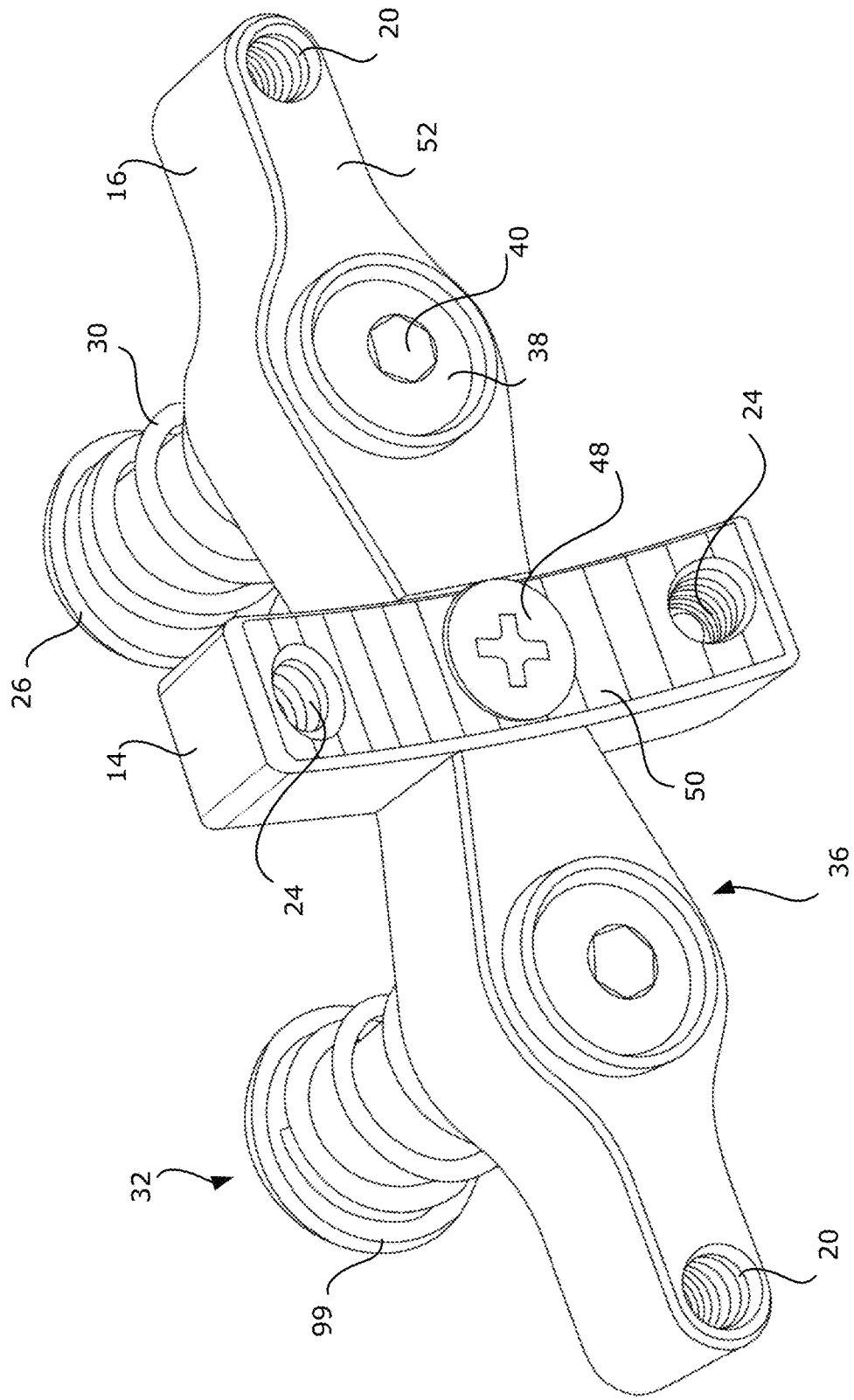
FIG. 1B is a bottom, isometric view of the improved suspension restraint device of FIG. 1A.
Figure 1C:
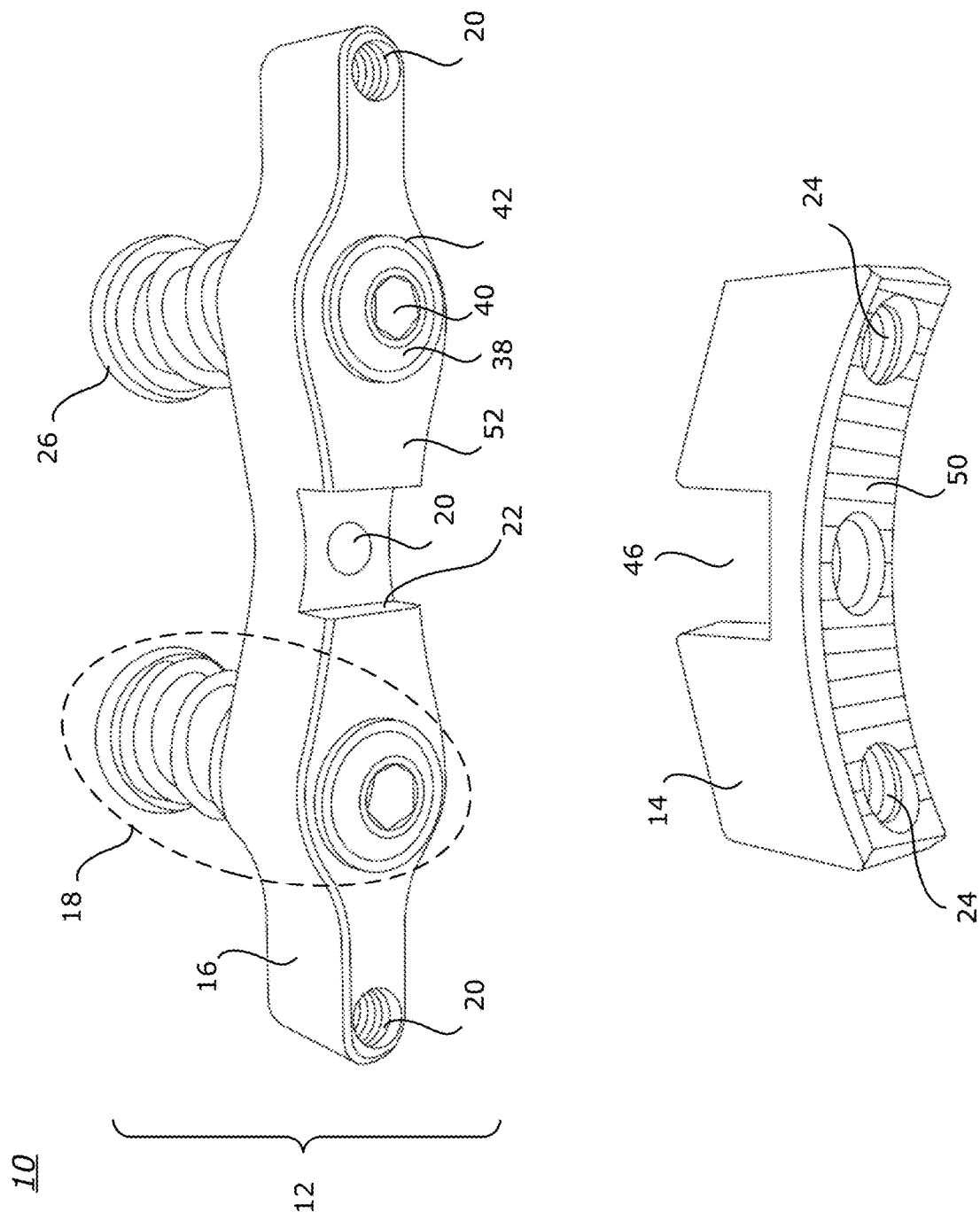
FIG. 1C is a disassembled view of the improved suspension restraint device of FIGS. 1A-1B.

FIG. 1A is a top, isometric view of an improved suspension restraint device 10 in accordance with an embodiment of the present disclosure. FIG. 1B is a bottom, isometric view of the improved suspension restraint device 10 of FIG. 1A. And FIG. 1C is a disassembled view of the improved suspension restraint device 10 of FIGS. 1A-1B. It is recognized that some of the fasteners are omitted in FIG. 1C to avoid unnecessarily cluttering the structures presented therein. For brevity, certain sets of related figures may be referred to as a single, multi-part figure to facilitate a clearer understanding of the illustrated subject matter. For example, FIGS. 1A-1C may be individually or collectively referred to as FIG. 1.

FIG. 1 illustrates an improved suspension restraint device 10 for use in releasably locking a front fork 56 (FIGS. 2-3) of a motorcycle 54 (FIG. 2) such as a motocross bike. In some cases, the front fork 56 is locked in place for a start of a race in accordance with the present disclosure.

In an embodiment, the improved suspension restraint device 10 can define a multi-position (e.g., via multi-buttons, pins, or some other biased retention member) base design in preparation for lock-down. The improved suspension restraint device 10 of FIG. 1 includes a hold down (e.g., retention) component 12 and a cross member 14. The hold down component 12 can further include a hold down base 16 and a plurality of biased retention members, which in FIG. 1 are represented as latching pins 18.

The latching pins 18 of the present disclosure may be interchangeably referred to herein as spring-loaded button assemblies 18, spring-loaded pin assemblies 18, biased retention devices 18, or some other like term. (e.g., two such assemblies are shown in the embodiment of FIG. 1). One of skill in the art will recognize, however, that latching pins 18 may take any suitable form. Hence, the spring-loaded button assemblies 18 are not limiting unless expressly claimed as limiting. Other biasing members (e.g., magnets, electromagnets, gravity-fed structures, vacuum-based structures, gas-filled structures, and the like) are of course contemplated.

Providing a multi-position hold-down component 12 that employs multiple latching pins 18 can allow a rider to have a choice of fork compression at the start of a race event without the need to install multiple lock-down components. The hold down base 16 can have an affixation subsystem to permanently or temporarily affix the hold-down component 12 and cross member 14 to a fork guard 58 (FIGS. 2-3).

In the embodiment of FIG. 1, the affixation subsystem includes a plurality of first fastener receiving holes 20 (e.g., screw-threaded holes or some other apertures), a base notch 22, a cross member notch 46, and a plurality of cross member mount holes 24. In other cases, a different affixation subsystem is employed. For example, in some cases, the affixation subsystem includes posts, bosses, raised perturbations, pins, wells, slots, keyholes, smooth surfaces, abraded surfaces, mating components, or any other suitable affixation means.

In embodiments where latching pins 18 are formed as spring-loaded pin assemblies 18, the members can include a button/cap 26, a plunger 28 (e.g., a plunger rod, a piston, a bolt, or the like), and a plunger spring 30. The button/cap 26 can be affixed to a first distal end 32 of the plunger 28 via a cap fastener 34 (e.g., a screw threaded fastener), and a second distal end 36 of the plunger 28 can carry an engagement plate 38 (e.g., fastened thereto via a plate fastener 40 (e.g., a screw threaded fastener) or integrally formed therewith).

A given engagement plate 38 is configured to engage with a fork 56 (FIGS. 2-3) or a fork ring 68 (FIGS. 2-3) and to withstand the forces associated with a motocross start and/or a first race impact. Accordingly, the engagement plate 38 may be formed from any suitable material (e.g., steel, stainless steel, copper, platinum, aluminum, a composite, a plastic, or some other material), and the engagement plate may have any suitable size, shape, thickness, or other characteristics. A given engagement plate 38 is shaped and sized to otherwise be retained in a portion of a corresponding pin receiving through hole 42 when not engaging a fork 56 or fork ring 68. In the embodiment of FIG. 1, the engagement plate 38 has a disc-like washer shape, but other shapes are of course contemplated.

A given plunger spring 30 is positioned around a corresponding plunger 28 between the button/cap 26 and the hold down base 16, biasing the button/cap 26 away from the hold down base 16. Due to such biasing, the plunger 28 is configured to readily move its respective engagement plate 38 back into engagement with its related pin receiving through hole 42 and out of any path of travel of the fork 56 (FIGS. 2-3) of the motorcycle 54 (FIG. 2) and/or its fork ring 68 (FIGS. 2-3) outside the start of a given race. While the biased retention members 18 have, for the sake of illustration, been shown as a spring-loaded pin assembly 18, it is to be understood that the spring-loading/biasing may instead be provided by, for example, a spring steel element, a magnetic element, and additionally or alternatively some other element and still be within the scope of the present disclosure. In fact, a biased retention member 18 employing a spring steel component (e.g., a Belleville washer, coned disc spring, or some other shape retention structure) may broadly be considered to be a spring-loaded pin assembly 18, a latching pin 18, or some other such device.

The cross member 14, when deployed, cooperates with the hold down base 16. In some cases, the cross member 14 and the hold down base 16 are united as a single structure. In other cases, such as in the embodiment of FIG. 1, the cross member 14 and hold down base 16 are permanently or temporarily united via the base notch 22 and cross member notch 46. In at least one embodiment the cross member 14 can define a central through hole 44, a plurality of mount holes 24 (e.g., a pair of threaded mount holes, one on either side of the central through hole 44, in the illustrated embodiment; or another number of mount holes), and a cross member notch 46. In an embodiment, the cross member 14 can be located between two given biased retention members 18 (e.g., spring-loaded pin assemblies 18), which promotes an even load distribution. In an embodiment, the central through hole 44 is configured to be aligned with a central one of the of first fastener receiving holes 20 in the hold down base 16 so that that the cross member 14 and the hold down base 16 can be fastened together, for example, by a threaded linkage fastener 48 or some other fastener. In an embodiment, the member notch 46 can be mutually received in the base notch 22 of the hold down base 16 (i.e., for a slidably fitting interconnection therebetween), promoting the connection between the cross member 14 and the hold down base 16 and limiting rotation/torsion between those parts. In an embodiment, the central through hole 44 and the member notch 46 are both centrally aligned within the cross member, with the cross member 14 extending equally or at least substantially equally to either side of the hold down base 16 when connected thereto.

The cross member mount holes 24 can provide additional connection points to the motorcycle fork guard 58 (FIGS. 2-3), with such mount holes 24 aligned in a second direction B different than the first direction A of alignment of the first fastener receiving holes 20 in the hold down base 16. In an embodiment, the first direction A can be substantially perpendicular to the second direction B (e.g., at an angle of 80°-100°; 85°-95°; or 90°±1°). In an embodiment, the first direction A can be substantially vertically aligned relative to the motorcycle fork guard 58 (e.g., the height direction of the motorcycle, substantially parallel the motorcycle fork 56, or by some other description), and the second direction B can be substantially horizontal to the motorcycle fork guard 58.

In another embodiment (not shown), the second direction B can be oblique to the first direction A, particularly if the cross member 14 defines yet a further mounting direction (not shown) different than directions A or B (e.g., cross member 14 in the general shape of an "X"—not shown). In yet another embodiment, the cross member 14 can define a multi-directional shape (e.g., X, V, or U shape, by way of example only) to provide more than the second direction B for attachment and still be within the scope of the disclosure. The presence of the additional connection points (e.g., via the mount holes 24) and the at least two distinct mounting directions A, B can increase the mechanical stability of the improved suspension restraint device 10 and the loading limits and load distribution of the interconnection between the improved suspension restraint device 10 and any motorcycle fork guard 58 to which it may be attached.

In an embodiment, the first fastener receiver holes 20 of the hold down component 12 and the mount holes 24 of the cross member 14 are located such that no two mounting positions are proximate one another (e.g., at least 0.5 inches, at least 0.75 inches, or at least 1.0 inches away from the nearest other hole and related fastener), thereby limiting the opportunity for stress concentration in the motorcycle fork guard 58 due to the proximity of such holes and the related attachment fasteners relative to one another.

In an embodiment, the cross member 14 may be substantially arcuate, defining a concave member surface 50. The concave member surface 50 can be designed to have a similar curvature as any motorcycle fork guard 58 (FIGS. 2-3) with which it is to mate (e.g., this component can be manufactured to mate with different makes or models of motorcycles and/or motorcycle fork guards, as needed). In an embodiment, the concave member surface 50 can generally mate with a base mounting surface 52 of the hold down base 16 proximate the intersection thereof, to facilitate continuous contact of the assembled improved suspension restraint device 10 with the motorcycle fork guard 58 when mounted thereto. The combined surface area (both in total and in directional spread) of the concave member surface 50 and the base mounting surface 52 helps to increase the stability of the mounting between the improved suspension restraint device 10 and the motorcycle fork guard 58. In an embodiment, instead of being releasably attached to the hold down base 16, the cross member 14 can be permanently attached thereto (e.g., riveted, epoxied, metallurgically bonded with, or permanently affixed in some other way) or integrally formed therewith (e.g., co-molded, forged, cast, 3D printed, or formed in some other way) and still be within the scope of the present disclosure.

Figure 2A:
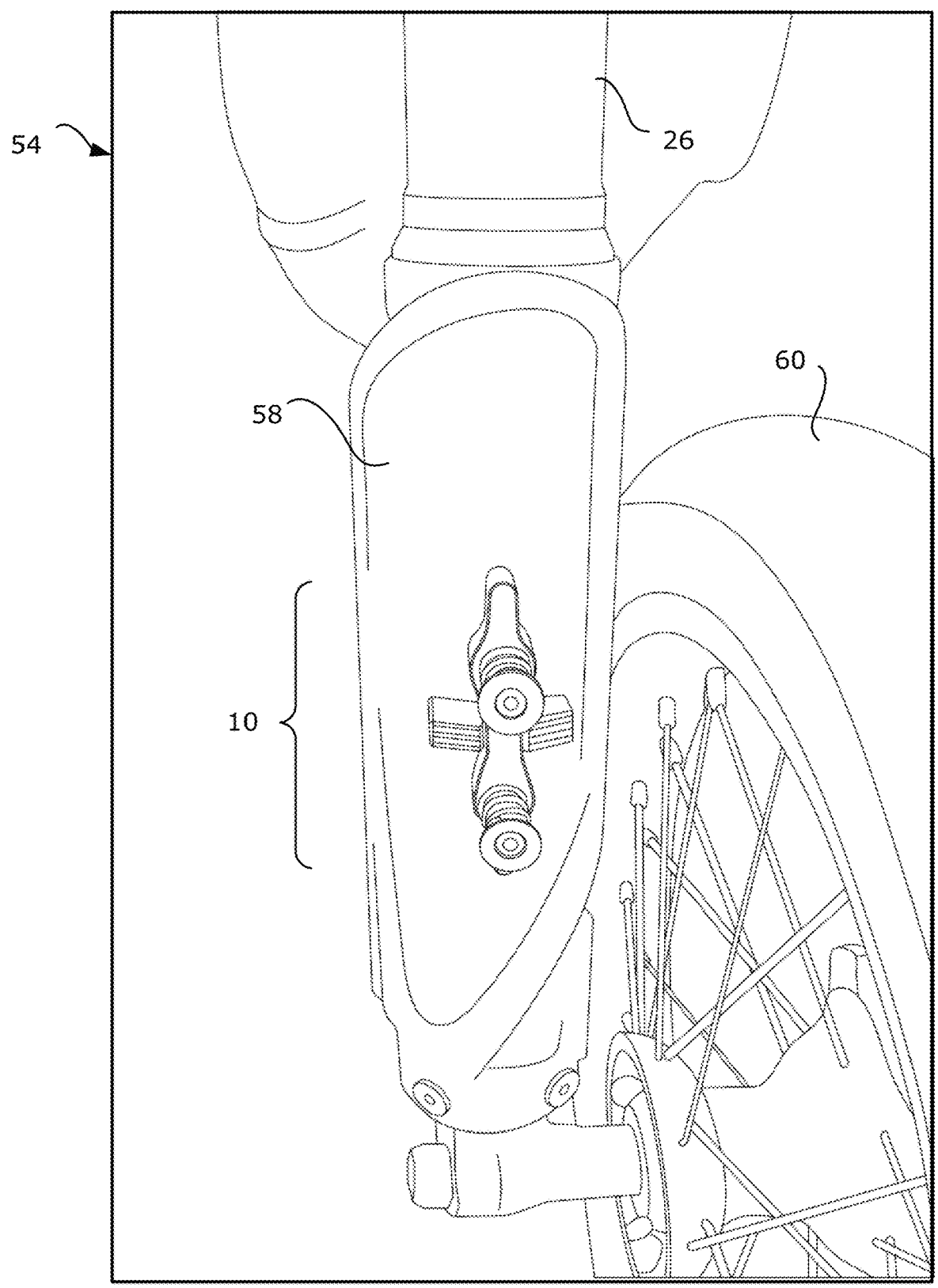
FIG. 2A is a partial, front view of a motorcycle incorporating an improved suspension restraint device in accordance with an embodiment of the present disclosure.
Figure 2B:
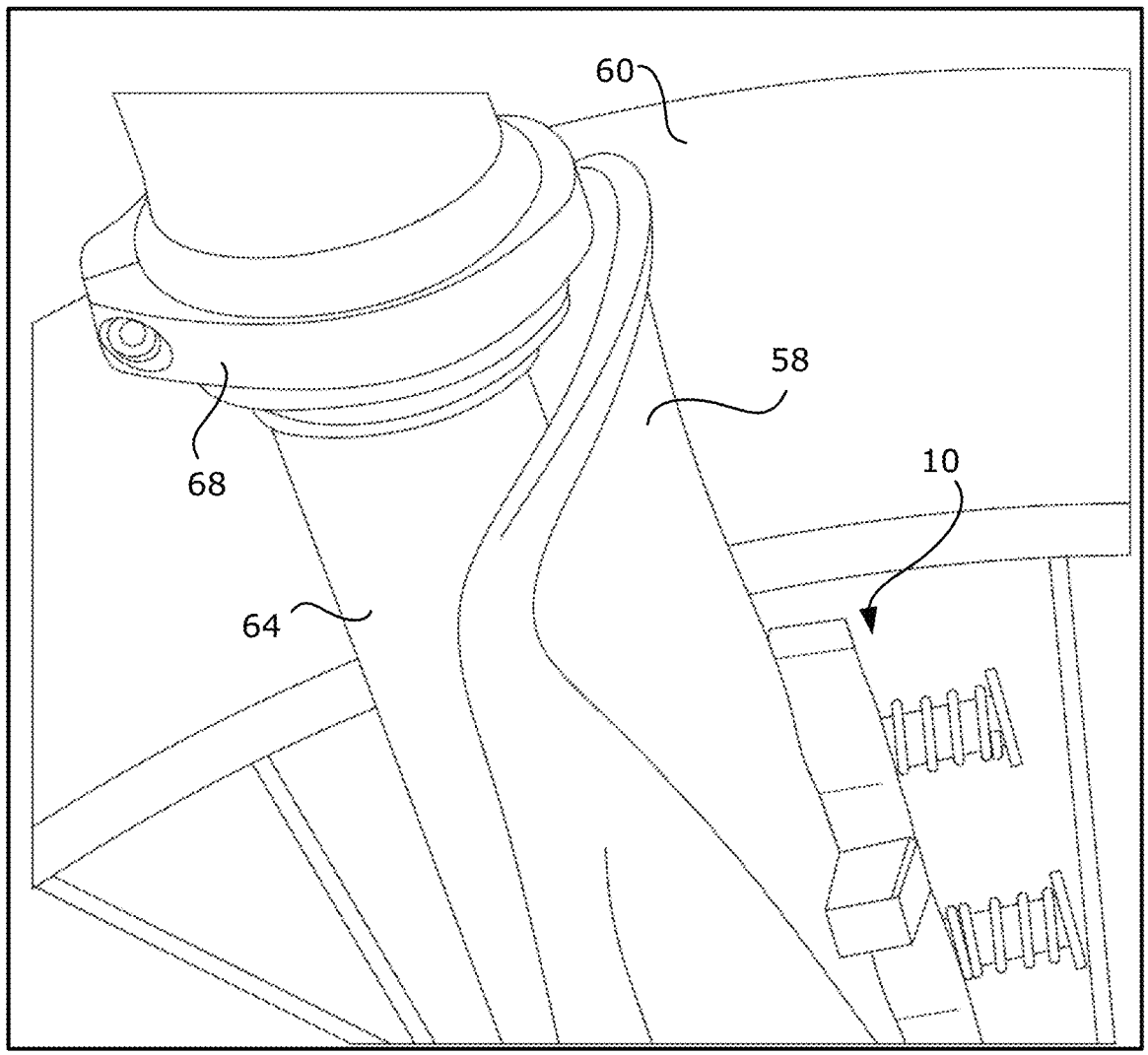
FIG. 2B is a partial, side view of the motorcycle fork employing a motorcycle fork guard and the improved suspension restraint device of FIG. 2A.
Figure 3:
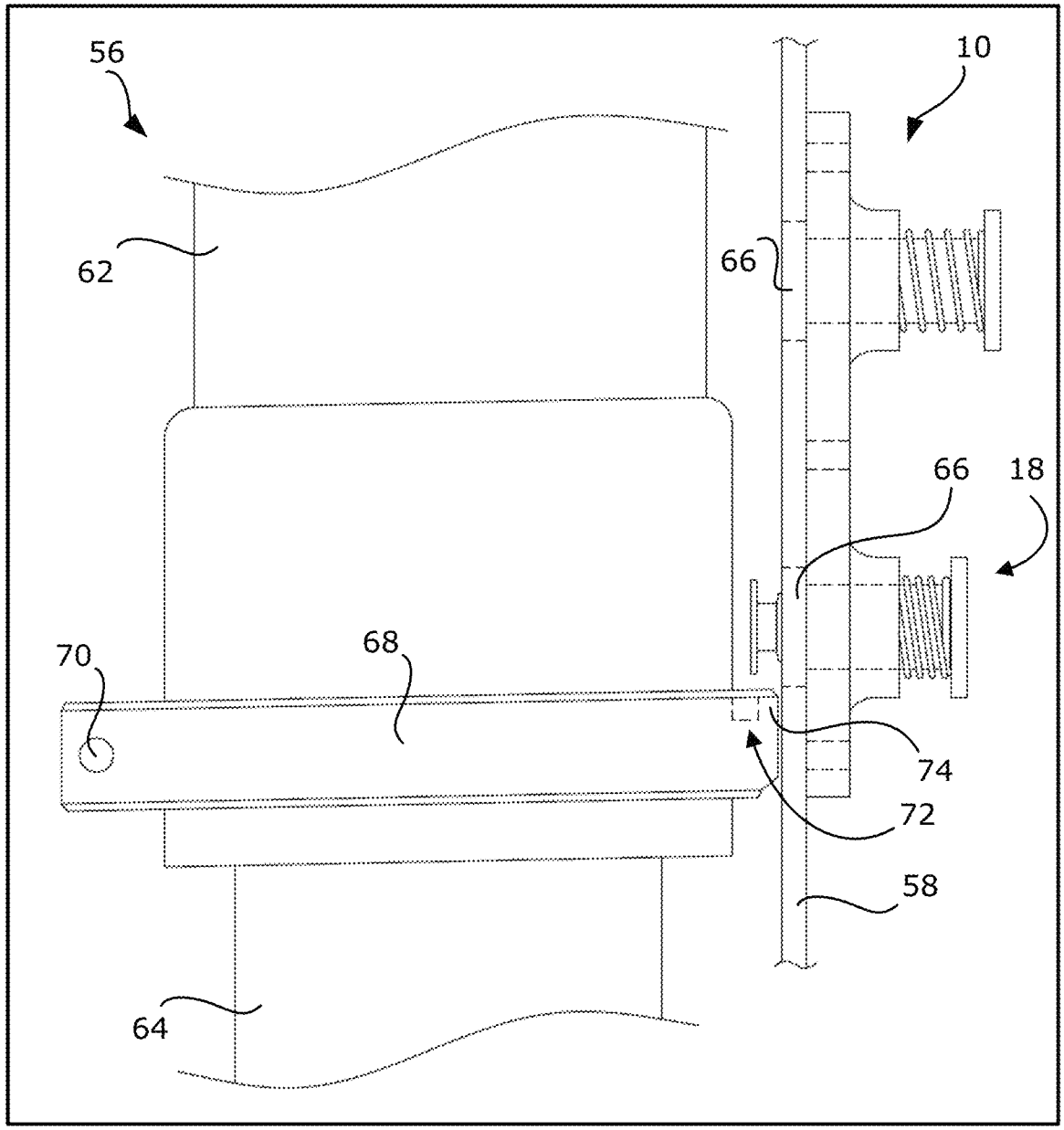
FIG. 3 is a partial side assembly view of a motorcycle fork, a motorcycle fork guard, and a partial improved suspension restraint device in accordance with an embodiment of the present disclosure.

FIG. 2A is a partial, front view of a motorcycle incorporating an improved suspension restraint device 10 in accordance with an embodiment of the present disclosure. FIG. 2B is a partial, side view of the motorcycle fork 56 employing a motorcycle fork guard 58 and the improved suspension restraint device 10 of FIG. 2A. And FIG. 3 is a partial side assembly view of a motorcycle fork 54, a motorcycle fork guard 58, and a partial improved suspension restraint device 10 in accordance with an embodiment of the present disclosure. For brevity, certain sets of related figures may be referred to as a single, multi-part figure to facilitate a clearer understanding of the illustrated subject matter. For example, FIGS. 2A-2B may be individually or collectively referred to as FIG. 2.

FIGS. 2-3 illustrate an improved suspension restraint device 10 in use with a motorcycle 54, in accordance with an embodiment of the present disclosure. In FIG. 3, the side assembly view of a motorcycle fork 56, a motorcycle fork guard 58, a latching pin 18, and an improved suspension restraint device 10 are shown without the cross member 14 thereof for ease of illustration of interconnection between the fork 56 and the improved suspension restraint device 10.

The motorcycle 54 can include a front wheel 60 and a fork 56 (e.g., the front fork of the motorcycle). The fork 56 can be in the form of a two-sided inverted fork configured to rotatably carry the front wheel 60. The fork 56 can include a pair of upper tubes 62 and a pair of lower tubes 64 (e.g., suspension members) (e.g., a set of each (i.e., an upper and lower tube) associated with each side of the fork 56), with a given motorcycle fork guard 58 mounted to relative to each lower tube 64, for example, to shield that corresponding lower tube 64 from dirt, mud, sand, rocks, and other debris. A given lower tube 64 can be configured to slidably travel at least partially within a respective upper tube 62 of the fork 56 and facilitate the rotatable mounting of the front wheel 60 at a distal end thereof. In an embodiment, each lower tube 64 is configured as a suspension member and thereby configured to otherwise absorb at least a portion of any shock experienced by the front wheel 60. Furthermore, the motorcycle fork guard 58 can have one or more access ports 66 therethrough to permit travel of at least a portion of a corresponding plunger 28 and/or engagement plate 38 through the motorcycle fork guard 58 and to a given fork ring 68.

At least one upper tube 62 can carry at least one fork ring 68 for releasable engagement with a corresponding spring-loaded pin assembly 18 (particularly the engagement plate 38 and/or plunger 28 associated therewith) of the improved suspension restraint device 10.

In an embodiment, the fork ring 68 can be in the form of a ring. The fork ring 68 may particularly be a split-ring, clamped where desired using an interface member fastener 70, facilitating the releasable attachment thereof to a given upper tube 62. In an embodiment, the fork ring 68 can instead be integral with and/or permanently attached to a given upper tube 62. In an embodiment, the fork ring 68 may be positioned proximate a distal end of a given upper tube 62. However, the fork ring 68 may be positioned at a distance away from the distal end of a given upper tube 62, allowing for a greater degree of compression to be achieved at the point when the improved suspension restraint device 10 is locked to the fork ring 68, for example, for a start of a race.

The fork ring 68 can include a mating surface 72, for example, a ring slot, as shown, defined in part by a recess wall 74 associated with the fork ring 68, to interface with a corresponding engagement plate 38 of a spring-loaded pin assembly 18 of a given improved suspension restraint device 10. In an embodiment, the mating surface 72 of the fork ring 68 can, instead, be in the form of a hook (not shown). In an embodiment, engagement between the mating surface 72 and an active portion of the latching pin 18 may first be facilitated by first compressing the fork 56 of the motorcycle 54 such that the fork ring 68 is below a corresponding spring-loaded pin assembly 18. Upon sufficiently compressing the fork 56, the desired spring-loaded pin assembly 18 can be pressed in, and the compression on the fork 56 can be eased or otherwise released until the mating surface 72 of the fork ring 68 and the spring-loaded pin assembly 18 are able to engage with one another. Once the connection therebetween is set, the compression on the spring-loaded pin assembly 18 can be released, as the motorcycle 54 has been readied for a start of a race.

Upon hitting a first aggressive slow down (e.g., braking), a first major bump, and/or experiencing some other front-end impact, the relative travel between a given upper tube 62 and a corresponding lower tube 64 can be expected to cause the improved suspension restraint device 10 to become disengaged from the fork ring 68. Upon such disengagement, the bias associated with the spring-loaded pin assembly 18 or another biased retention element of the improved suspension restraint device 10 can be expected to cause the spring-loaded pin assembly 18 to retract back from the range of travel of the corresponding lower tube 64 and/or fork ring 68, until otherwise expressly deployed again (e.g., for a beginning of a next race).

It is to be understood that one or more fork ring 68 (only one of which is shown in FIGS. 2-3) can be employed, either employed on a single upper tube 62 or on both upper tubes 62. The use of fork ring 68 on each side of the fork 56 permits redundant improved suspension restraint devices 10 (e.g., fork latching devices) on either side of the fork 56. Further, multiple spaced fork ring 68 can be used to permit both spring-loaded pin assemblies 18 (particularly the engagement plate 38 and/or plunger 28 associated therewith) or other biased retention elements of the improved suspension restraint device 10 to be concurrently employed; or to permit a greater range of suspension restraints from which to be chosen.

Figure 4A:
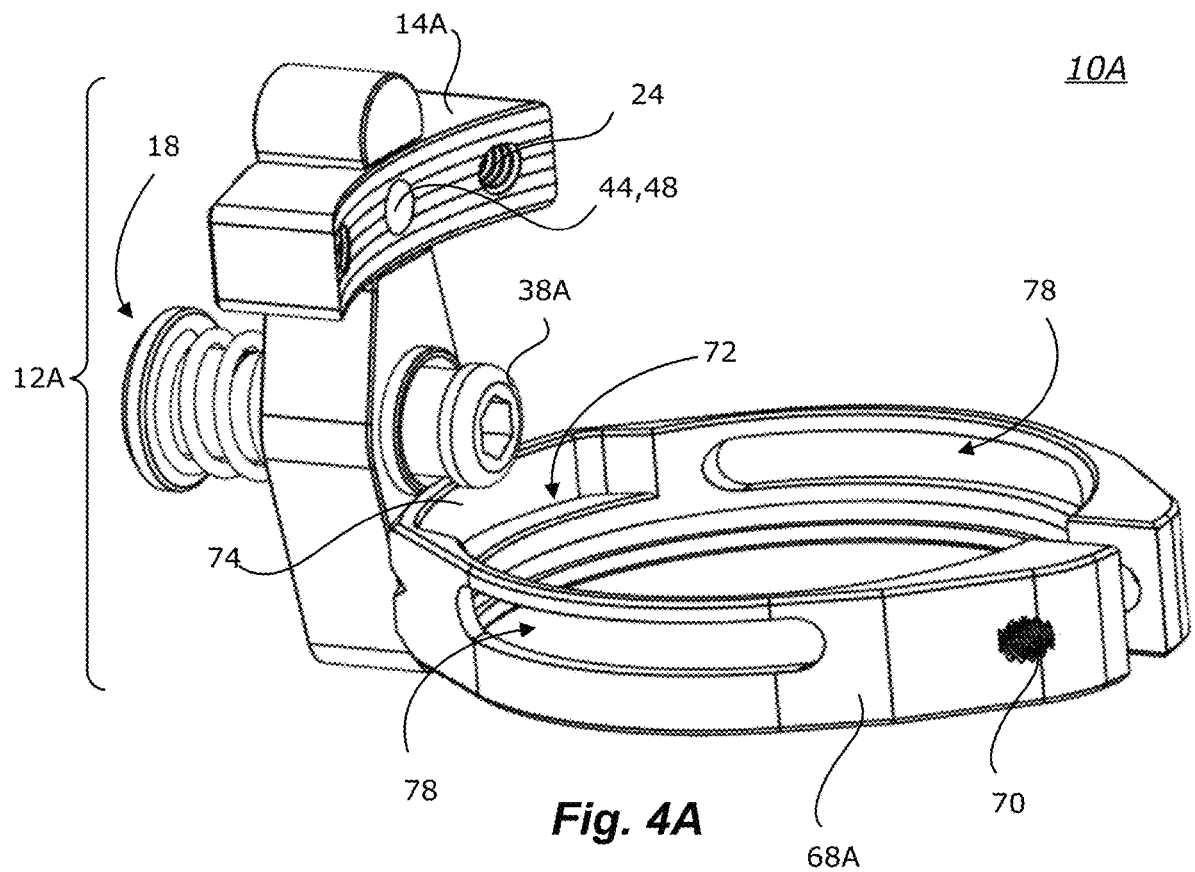
FIG. 4A is a top, isometric view of an improved restraint device system embodiment having a single latching pin configuration.

FIG. 4A is a top, isometric view of an improved restraint device system 10A embodiment having a single latching pin 18A configuration.

Figure 4B:
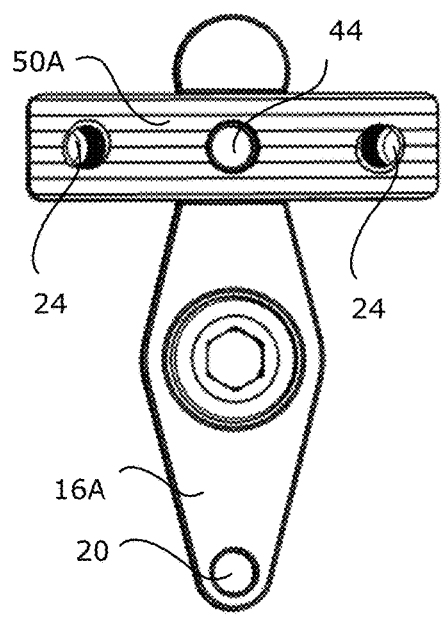
FIG. 4B is a front-side elevation view of the hold down base and cross member of the improved restraint device system embodiment of FIG. 4A.

FIG. 4B is a front-side elevation view of the hold down base 16A and cross member 14A of the improved restraint device system 10A embodiment of FIG. 4A.

Figure 4C:
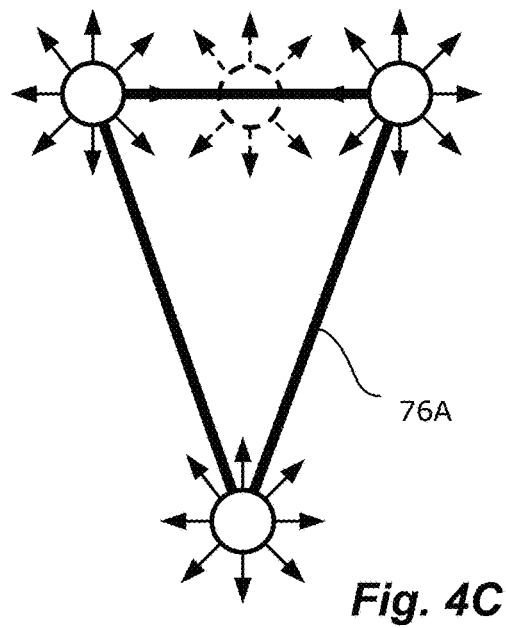
FIG. 4C is a separation of stress schematic representative of the improved restraint device system embodiment of FIGS. 4A-4B.

FIG. 4C is a separation of stress schematic 76A representative of the improved restraint device system 10A embodiment of FIGS. 4A-4B.

Figure 4D:
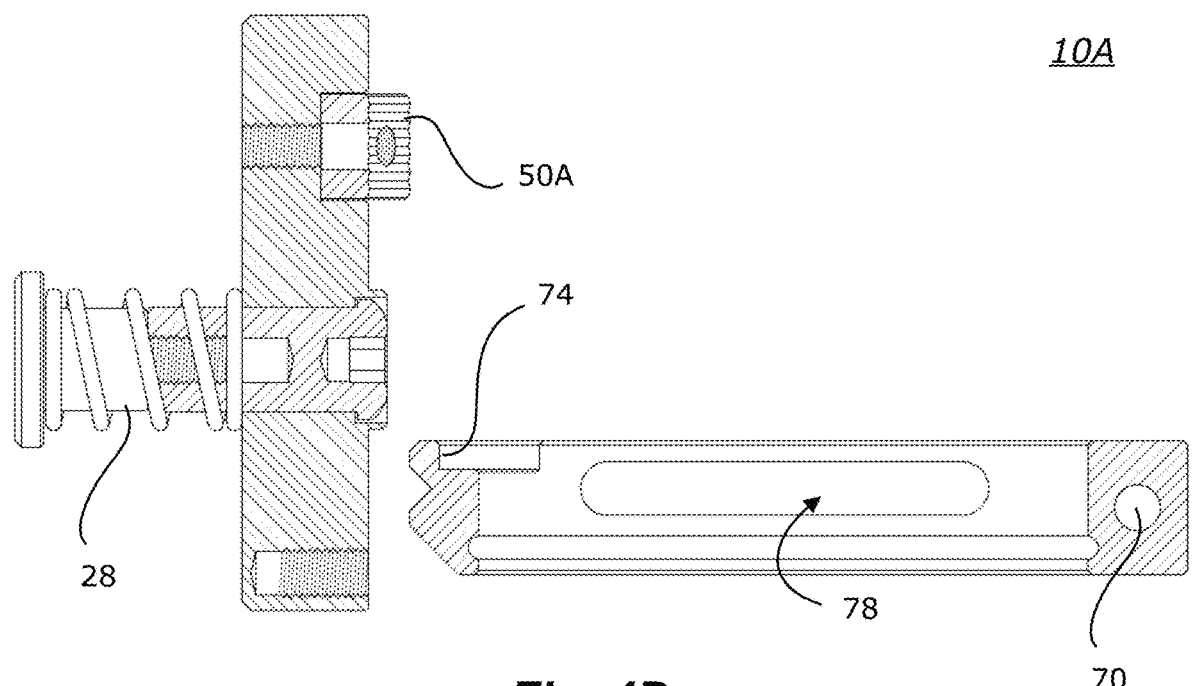
FIG. 4D is a first operational view of the improved restraint device system embodiment of FIG. 4A in a pre-deployment state.

FIG. 4D is a first operational view of the improved restraint device system 10A embodiment of FIG. 4A in a pre-deployment state.

Figure 4E:
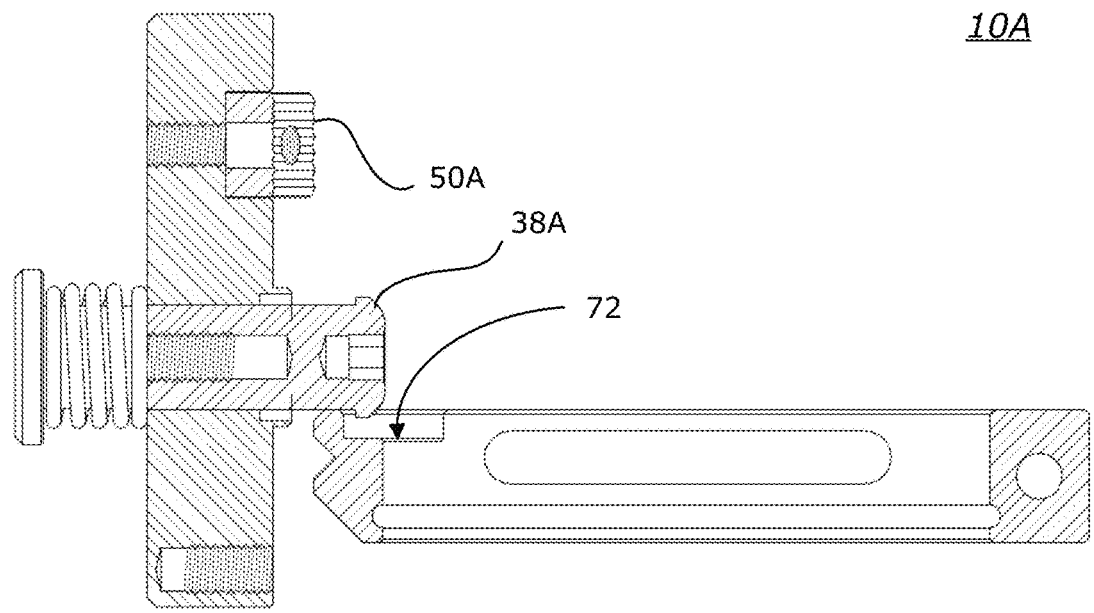
FIG. 4E is a second operational view of the improved restraint device system embodiment of FIG. 4A in a post-deployment state.

FIG. 4E is a second operational view of the improved restraint device system 10A embodiment of FIG. 4A in a post-deployment state.

Figure 5A:
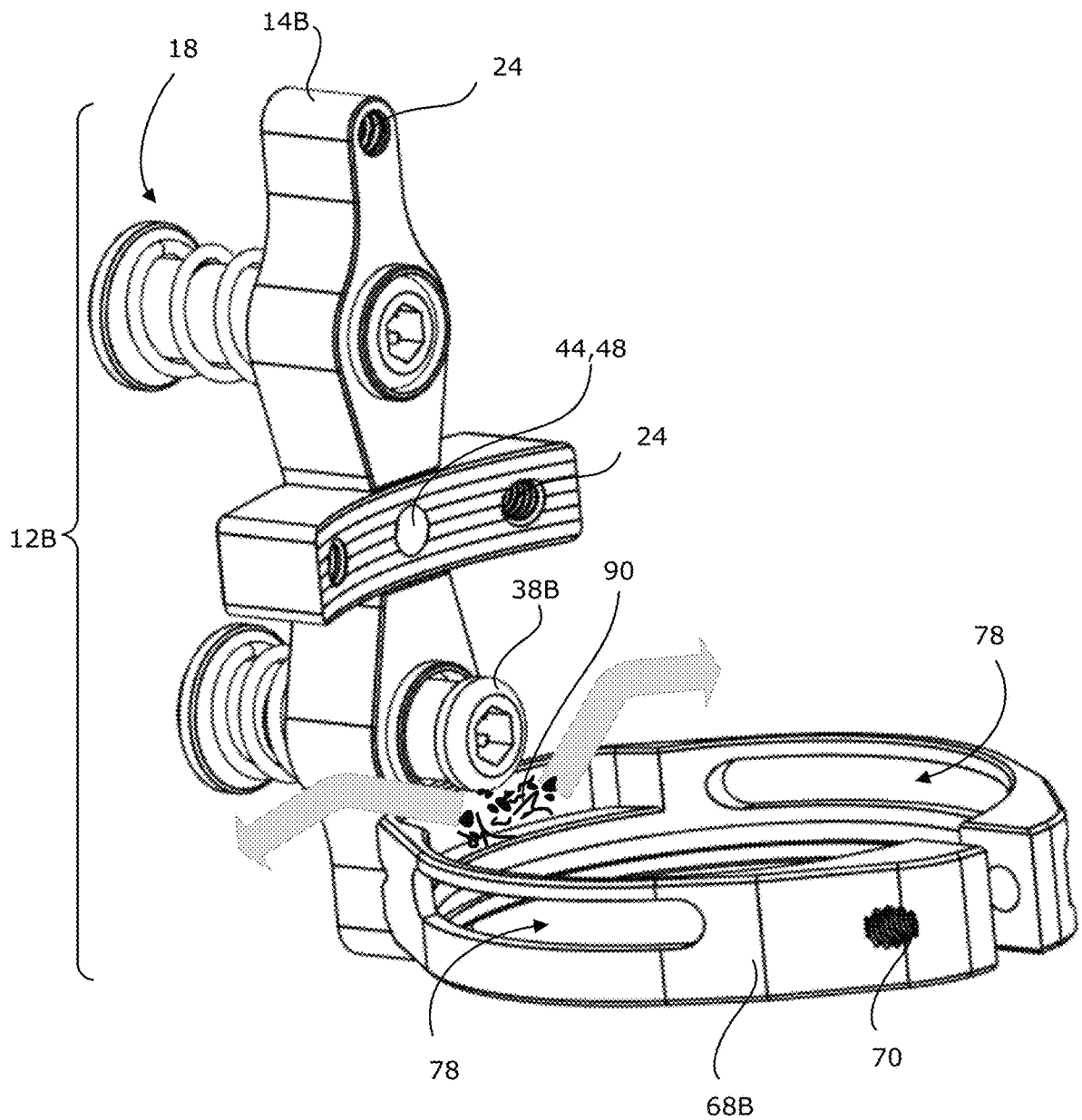
FIG. 5A is a top, isometric view of an improved restraint device system embodiment having a double latching pin configuration.

FIG. 5A is a top, isometric view of an improved restraint device system 10B embodiment having a double latching pin 18B configuration.

FIG. 5B is a front-side elevation view of the hold down base 16B and cross member 14B of the improved restraint device system 10B embodiment of FIG. 5A.

FIG. 5C is a separation of stress schematic 76B representative of the improved restraint device system 10B embodiment of FIGS. 5A-5B.

Figure 5D:
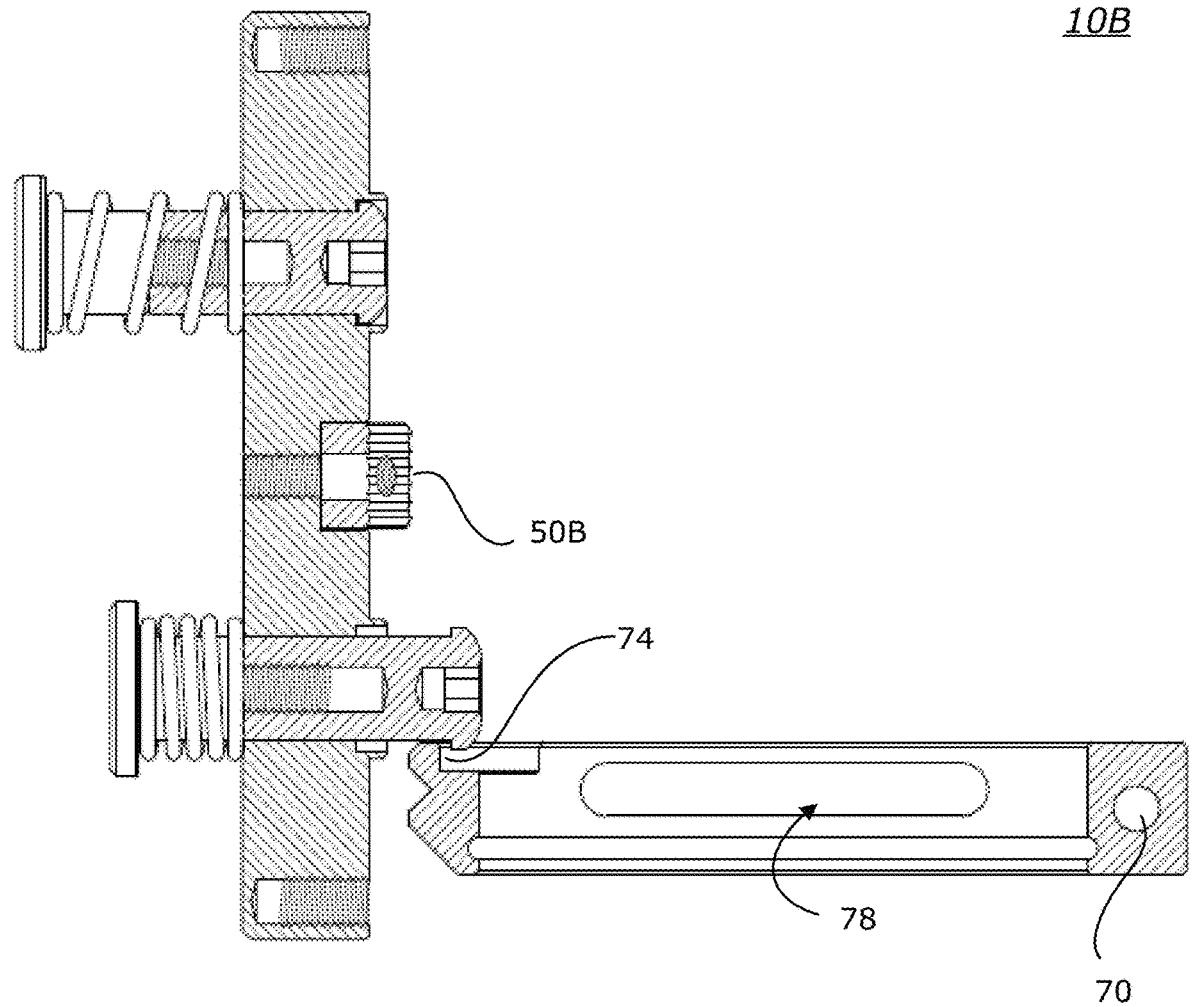
FIG. 5D is a first operational view of the improved restraint device system embodiment of FIG. 5A in a first post-deployment state.

FIG. 5D is a first operational view of the improved restraint device system 10B embodiment of FIG. 5A in a first post-deployment state.

Figure 5E:
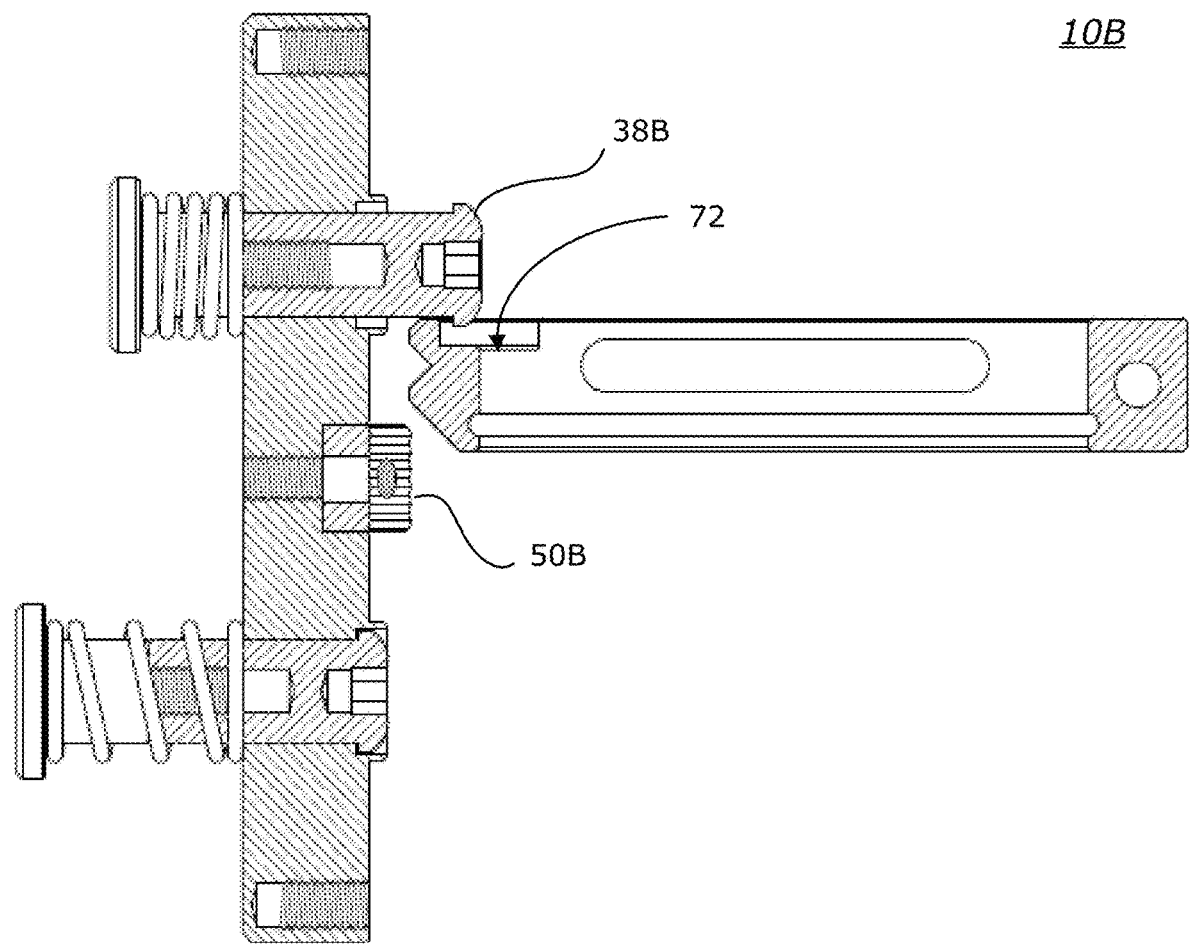
FIG. 5E is a second operational view of the improved restraint device system embodiment of FIG. 5A in a second post-deployment state.

FIG. 5E is a second operational view of the improved restraint device system 10B embodiment of FIG. 5A in a second post-deployment state.

In the present disclosure, for brevity, certain sets of related figures may be referred to as a single, multi-part figure to facilitate a clearer understanding of the illustrated subject matter. For example, FIGS. 4A-4E may be individually or collectively referred to as FIG. 4. FIGS. 5A-5E may be individually or collectively referred to as FIG. 5. Structures earlier identified are not repeated for brevity.

FIGS. 4 and 5 are described together. In FIG. 4, an improved restraint device system 10A includes a single latching pin 18 deployed in a hold down component 12A. In FIG. 5, another improved restraint device system 10B includes a double latching pin 18 deployed in a hold down component 12B. More generally, the system embodiment of FIG. 4 includes a single latching pin button 18, and the system embodiment of FIG. 5 includes a two latching pin buttons 18. To avoid unnecessarily cluttering the illustrations neither of FIG. 4 nor 5 illustrates a motorcycle fork guard 58, which is present between the hold down component 12, 1B and the fork ring 68A, 68B, respectively or a motorcycle fork 56, which would be supporting the fork ring 68A, 68B, respectively at the lower tube 64.

In FIGS. 4A, 5A, a motorcycle fork 56 has been compressed downward, toward the ground, below a latching pin 18 (e.g., FIG. 4D). Then, the latching pin 18 is deployed, for example by depressing the button cap 26, which causes the respective engagement plate 38A, 38B to extend past the recess wall 74 (e.g., FIG. 4E) of the fork ring 68A, 68B. After the engagement plate 38A, 38B is extended toward the motorcycle fork 56, the motorcycle fork 56 is released, which causes the fork 56 and the fork ring 68 to ascend back toward its steady-state position. When the mating surface 72 engages with the engagement place 38A, 38B enters the space created by the recess wall 74 and the mating surface 72 (e.g., a ring slot) and engages (e.g., contacts) with the mating surface 72, the ascension of the motorcycle fork 56 is stopped, and the motorcycle 54 is ready to start a race (i.e., the latching pin 18 is deployed). In FIG. 5D, the motorcycle fork 56 has been compressed deeply to permit deployment of the lower biased retention mechanism 18, and in FIG. 5E, the motorcycle fork 56 has been compressed less deeply to permit deployment of the upper biased retention mechanism 18.

As evident in FIGS. 4 and 5, the engagement plate 38A, 38B may have any useful configuration and composition. The plate may have at squared edge. Alternatively, the engagement plate 38A, 38B may have at least one gently shaped edge (e.g., a bullnose edge, a tapered edge, or an edge in a different form). It is recognized that the gently shaped edge may facilitate entry of the engagement plate into the open well of the fork ring. The plate may have a disc shape (e.g., like a washer), or the plate may have a different form factor. In some cases, the engagement plate 38A, 38B may have an arcuate form factor that more cooperatively mates with the mating surface 72 of the fork ring 68. In some cases, the engagement plate 38A, 38B may have a thickness that cooperatively mates the recess wall 74 and the mating surface 72 of the fork ring 68. In some cases, the plate may be formed of steel, stainless steel, copper, platinum, aluminum, a composite, a plastic, or some other material. Other configurations and compositions are contemplated.

In the embodiments of FIGS. 4 and 5, the bullnose configuration of the engagement plate 38A, 38B coupled to the end of the latching pin provides particular benefits. For example, the rounded, smooth edges reduce the likelihood that a latching pin 18 or any part thereof will scratch otherwise damage the motorcycle fork 56. The lower profile and smooth edges further reduce the likelihood that dirt, mud, sand, rocks, or other debris 90 will get hung up between the fork guard 58 and the motorcycle fork 56. Instead, due at least in part to the shaped components, the debris 90, as indicated in FIG. 5A, will be pushed out of the open latch area formed by the recess wall 74 and the mating surface 72 during the latching process To further facilitate the operation of the engagement plate 38A, 38B and the fork ring 68A, 68B, the fork ring 68A, 68B is optionally arranged with a large, open latch area formed by the recess wall 74 and the mating surface 72. In some cases, this open latch area has a width that is at least two times the diameter or length of the engagement plate 38A, 38B. In some cases, this open latch area has a depth that is at least two times the portion of the engagement plate 38A, 38B that extends into the recess (i.e., the latch area). In some cases, this open latch area has a depth that is at least two times the thickness of the engagement plate 38A, 38B. As one more benefit of the open latch area, the inventor has recognized that in some cases, the fork guard of a motorcycle may migrate from its original position because of debris strikes, minor crashes, contact of the guard with other motorcycles or riders, or for other reasons. By having a large, open and forgiving latch area, the latching pin can still land within the recess and latch properly.

The separation of stress schematic 76A of FIG. 4C may be aligned with the front-side elevation view of the hold down base 16A and cross member 14A of FIG. 4B at the center of a fork guard. The vertices of the separation of stress schematic 76A align with the crossmember mount holes 24 and the first fastener receiving holes 20, which are part of the affixation subsystem of the improved suspension restraint device 10A. Optionally, the separation of stress schematic may also align with the central through hole 44 of the cross member 14A. Fasteners are deployed in the crossmember mount holes 24 (and optionally the central through hole 44) and the first fastener receiving holes 20 to affix the improved suspension restraint device 10A to the fork guard 58. The directional arrows at each vertex of the stress schematic 76A, including in the optional center indicated by the dashed lines when a fastener is applied here, represent directions of force that the fasteners may exert on the fork guard 58. It is known that many fork guards 58 are formed of plastic, and it is further known that injection molded plastics include locally aligned polymers that encourage "tearing" of the plastic material. Hence, in conventional suspension restraint devices, where fasteners are located in a straight line, notable weakness of the fork guard is exacerbated, and the system fails. Conversely, the present distributed force fastening mechanism of the affixation subsystem leads to a more reliable suspension restraint device 10A.

Along the lines of FIG. 4C, the separation of stress schematic 76B of FIG. 5C may be aligned with the front-side elevation view of the hold down base 16B and cross member 14B of FIG. 5B. The vertices of the separation of stress schematic 76B align with the two crossmember mount holes 24 and the two first fastener receiving holes 20, which are part of the affixation subsystem of the improved suspension restraint device 10B. Fasteners are deployed in the crossmember mount holes 24 and the first fastener receiving holes 20 to affix the improved suspension restraint device 10B to the fork guard 58 in a "diamond" pattern. The directional arrows at each vertex of the stress schematic 76B represent directions of force that the fasteners may exert on the fork guard 58. One of skill in the art will recognize that the diamond (or dual-triangle) pattern of the distributed force fastening mechanism of the affixation subsystem of the embodiment of FIG. 5 leads to an even more reliable suspension restraint device 10B.

In operation, a motorcycle rider or some other person compresses the front forks 56 of the motorcycle 54 down a path of travel by a first amount. The motorcycle's front forks bear a fork ring 68 arranged to receive a latching pin 18, and the first amount is sufficient to advance the fork ring 68 below the latching pin 18. The rider then presses the button 26 of the latching pin 18 to advance the latching pin 18 at least partially into the path of travel of the front forks 56. The rider then releases the motorcycle's front forks 56 back up the path of travel, but less than the first amount and only until the engagement plate 38 of the latching pin 18 is contained in the open latch area (i.e., ring slot) formed by the mating surface 72 and the recess wall 74. Once the front forks are locked in the compressed state, tension caused by the latching pin 18 being temporarily held in place is sustained in the fork guard 58 at least in part by the plurality of fasteners positioned at vertices of a separation of stress pattern 76A, 76B that extends from a center point of the fork guard in the first and second directions. It is recognized that the separation of stress pattern may take any suitable shape or configuration.

Subsequently, as described in the present disclosure, the motorcycle rider will aggressively accelerate the motorcycle 54 and after some time, he will aggressively decelerate the motorcycle 54. While the motorcycle 54 is being accelerated, the temporarily positioned latching pin 18 holding the front forks 56 down will inhibit a wheelie. When the motorcycle is decelerated, however, the front forks 56 will further compress, which will allow the biased latching pin 18 to retract to its steady state position thereby freeing the front forks to their full range of travel.

The separation of stress schematics 76A, 76B illustrate various separation of stress patterns representing how a hold down component 12 is coupled to fork guard 56 of a motorcycle. A triangle pattern in FIG. 4C, for example, and a diamond (or dual-triangle) pattern in FIG. 5C are exemplary separation of stress patterns. Other patterns (e.g., square, rectangular, pentagonal, hexagonal, octagonal, circular, ovular, and any other suitable geometric or non-geometric shape) In some cases, improved durability of a fork guard has been found when the triangles are equilateral triangles with each angle being about sixty degrees (60°). In other cases, acceptable durability has been found when the triangles are isosceles triangles (or dual-isosceles triangles) when the two sides of the triangle having equal length are arranged in the same direction (e.g., vertical, up/down, normal to the ground, or the like) as the motorcycle forks. In at least one desirable triangular separation of stress pattern, a first acute angle is less than about forty-five degrees (45°)

and second and third acute angles are between about sixty-seven and one-half degrees and about eight-five degrees (67.5° to 85°).

In at least one exemplary case, a hold down component 12 is coupled to the center point of a fork guard 56 by a plurality of fasteners positioned at vertices of a stress pattern that extends from a center point of the fork guard in first and second directions. The center point of the fork guard 56, as that term is used herein is not necessarily a geometric center of the fork guard 56. Rather, the center point of the fork guard 56 is the location in the fork guard 56 where the installer of the hold down component 12 installs the hold down component 12. In many cases, this location will be in the line of force of the fork guard 56 between the mounting point or points of the fork guard 56 and the direction from which stress on the fork guard 56 will likely be received. In many cases, the center point will be about aligned with a central vertical plane formed through a lengthwise cross section of the motorcycle's fork guard, front tire, frame, seat, and rear tire.

Figure 6A:
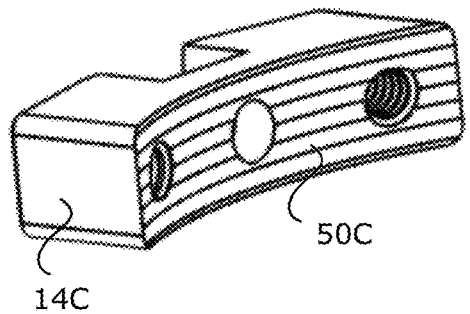
FIG. 6A is a top, front-side isometric view of an exemplary cross member.
Figure 6B:
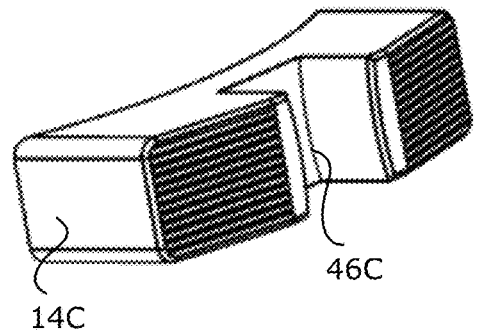
FIG. 6B is a top, back-side isometric view of the exemplary cross member of FIG. 6A.
Figure 6C:
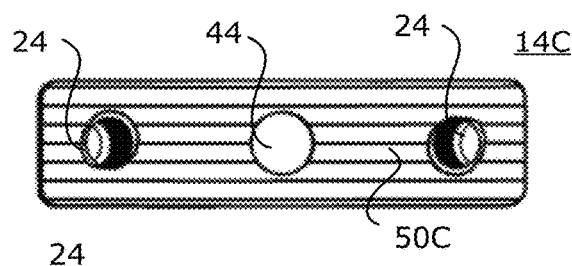
FIG. 6C is a front-side elevation view of the exemplary cross member of FIG. 6A.
Figure 6D:
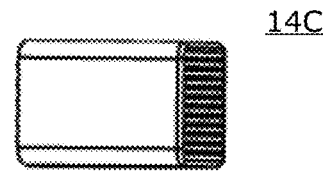
FIG. 6D is a right-side elevation view of the exemplary cross member of FIG. 6A.
Figure 6E:
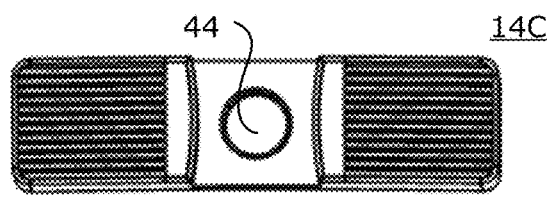
FIG. 6E is a back-side elevation view of the exemplary cross member of FIG. 6A.
Figure 6F:
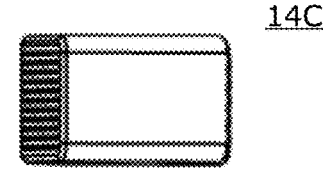
FIG. 6F is a left-side elevation view of the exemplary cross member of FIG. 6A.
Figure 6G:
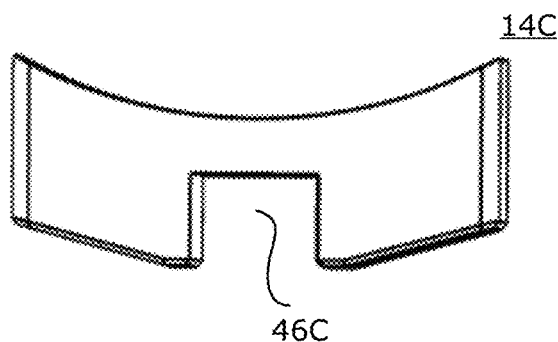
FIG. 6G is a top-side elevation view of the exemplary cross member of FIG. 6A.
Figure 6H:
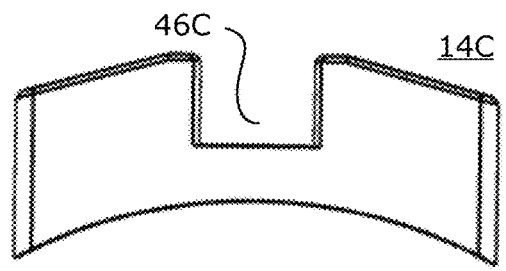
FIG. 6H is a bottom-side elevation view of the exemplary cross member of FIG. 6A.

FIG. 6A is a top, front-side isometric view of an exemplary cross member 14C. FIG. 6B is a top, back-side isometric view of the exemplary cross member 14C of FIG. 6A. FIG. 6C is a front-side elevation view of the exemplary cross member 14C of FIG. 6A. FIG. 6D is a right-side elevation view of the exemplary cross member 14C of FIG. 6A. FIG. 6E is a back-side elevation view of the exemplary cross member 14C of FIG. 6A. FIG. 6F is a left-side elevation view of the exemplary cross member 14C of FIG. 6A. FIG. 6G is a top-side elevation view of the exemplary cross member 14C of FIG. 6A. FIG. 6H is a bottom-side elevation view of the exemplary cross 14C member of FIG. 6A. In the present disclosure, for brevity, certain sets of related figures may be referred to as a single, multi-part figure to facilitate a clearer understanding of the illustrated subject matter. For example, FIGS. 6A-6H may be individually or collectively referred to as FIG. 6. Structures earlier identified are not repeated for brevity.

As evident in FIG. 6, the cross member 14C may have any suitable size and shape configuration, and the cross member 14C may be formed of any suitable materials. In some cases, for example, the cross member 14C may be formed of steel, stainless steel, copper, platinum, aluminum, a composite, a plastic, or some other material. Other configurations and compositions are contemplated.

The cross member 14C may have a chamfered edge, a bullnose edge, a tapered edge, a squared edge, a retracted edge, quarter-rounded edge, or an edge in some different form. The cross member 14C may be substantially arcuate, defining a concave member surface 50C. The concave member surface 50C can be designed to have a similar curvature as any motorcycle fork guard 58 with which it is to mate disc shape. Additionally, in some cases, the concave member surface 50C may include a binding profile.

In the embodiment of FIG. 6, the binding profile is arranged as a plurality of ridges and adjacent valleys on the concave member surface 50. These ridges and valleys may be purposely machined, molded, or formed in some other way. The ridges and valleys may further be arranged in any desirable direction, pattern, size, or other parameters. In the embodiment of FIG. 6, the ridges and valleys are formed parallel to the horizon (e.g., horizontal to the motorcycle). In this way, when the cross member 14C and hold down base 16 are attached to the motorcycle fork guard 56, the machined ridges of the concave member surface 50 will dig into the plastic fork guard 56 and provide additional assistance to prevent migration of the improved suspension device 10, 10A, 10B.

FIG. 7A is a top, front-side isometric view of an exemplary fork ring 68C. FIG. 7B is a top, back-side isometric view of the exemplary fork ring 68C of FIG. 7A. FIG. 7C is a front-side elevation view of the exemplary fork ring 68C of FIG. 7A. FIG. 7D is a right-side elevation view of the exemplary fork ring 68C of FIG. 7A, FIG. 7E is a back-side elevation view of the exemplary fork ring 68C of FIG. 7A, FIG. 7F is a left-side elevation view of the exemplary fork ring 68C of FIG. 7A, FIG. 7G is a top-side elevation view of the exemplary fork ring 68C of FIG. 7A. FIG. 7H is a bottom-side elevation view of the exemplary fork ring 68C of FIG. 7A. In the present disclosure, for brevity, certain sets of related figures may be referred to as a single, multi-part figure to facilitate a clearer understanding of the illustrated subject matter. For example, FIGS. 7A-7H may be individually or collectively referred to as FIG. 7. Structures earlier identified are not repeated for brevity.

As evident in FIG. 7, the exemplary fork ring 68C may have any suitable size and shape configuration, and the exemplary fork ring 68C may be formed of any suitable materials. In some cases, for example, the cross member 14C may be formed of steel, stainless steel, copper, platinum, aluminum, a composite, a plastic, or some other material. Other configurations and compositions are contemplated. In at least some cases, the exemplary fork ring 68C is formed of anodized aluminum.

In one embodiment, the fork ring 68C is anodized during production in black or any other desirable color. As the fork ring 68C travels up and down with the motorcycle fork 56 during riding of the motorcycle 54, at least one surface of the fork ring 68C rubs against the inside of the fork guard 58. When this rubbing occurs, the colored (e.g., black, red, green, silver, or another color) anodization layer is progressively removed from the fork ring 68C, thereby exposing the underlying natural color (e.g., silver, gray, or some other color) of the material under the anodized finish. Concurrently, the abrasive rubbing also wears away the material of the fork ring 68C that forms the mating surface 72 (e.g., the recess wall 74. At the recess wall 74 is thinned or otherwise reduced in size, the wall may break thereby preventing the latching pin 18 from latching.

This fork ring 68C of FIG. 7 includes a wear indicator formed by one or more wear indicator faces 80, a wear indicator groove, 82, and a shaped surface 84. As described herein, when the fork ring 68C travels up and down, the same action occurs when rubbing against the inside of the fork guard. Now, the one or more wear indicator faces 80 rubs against the fork guard 56, and at least some portion of the anodized finish of the fork ring 68C is removed from this area only. When the anodized finish on the one or more wear indicator faces 80 wears off, a silver or other base material color of the underlying material becomes visible. For a certain period of time, however, even though the wear indicator faces 80 are the color of the underlying material (e.g., silver), the anodized finish of the wear indicator groove 82 remains in its original production color (e.g., black, green, red, silver, or some other color). This condition can persist for a period of time (e.g., days, weeks, months, or some other period of time), and it is readily apparent that the fork ring 68C is not worn out because the remaining portion of the wear indicator groove 82 appears as a black line against a shiny silver color. When the entire face of the fork ring 68C that contacts the fork guard 56 turns silver, a rider can easily see that the fork ring 68C is worn out or nearing a point of failure (i.e., a point where the fork ring 58 can no longer reliably sustain the tension caused by the latching pin 18 being contained in the open latch area (i.e., ring slot) formed by the mating surface 72 and the recess wall 74.

The fork ring 68C includes a shaped surface 84 on its lower boundary (e.g., lower edge, the portion of the fork ring where its front face meets its lower face). The shape maybe a rounding, a chamfer, a taper, or some other shape, During operation of the improved suspension restraint device 10, 10A, 10B, as the motorcycle fork 56 is compressed downward, the fork ring 68 may contact an exposed portion of the latching pin 18 or some other structure. By including an shaped surface 84, the fork ring 68C will be encouraged to travel over the latching pin 18 or other interfering structure rather than getting hung up on such structure.

In some cases, a fork ring 68C will include an inside diameter groove 86. This groove may be useful to securely couple the fork ring 68C to the motorcycle fork 56. It is recognized that in some cases, a motorcycle includes an OEM wear ring positioned on the motorcycle fork 56. Such a steel or plastic ring is typically a wire type spring that prevents the fork guard from wearing away the aluminum upper fork as the fork guard travels up and down when the motorcycle is ridden. By allowing the inside diameter groove 86 to mate with or otherwise cooperate with the OEM steel wear ring, the fork ring 68C can be affixed more securely.

In some cases, a fork ring 68C will also include one or more flex structures 78 arranged to increase an opening capacity of the fork ring. In the embodiment of FIG. 7, for example, the flex structures 78 are arranged as apertures (e.g., holes, windows, or the like) in the sidewall of the fork ring 68C. In other cases, flex structures 78 may be formed of thinned sidewall areas, sidewalls of a second or otherwise different material, or the like. By creating one or more flex structures 78 in the fork ring 68C, the fork ring 68C can more easily be expanded (i.e., "flexed") and placed on a motorcycle fork 56. In the absence of such flex structures 78, a fork ring 68C could more easily weaken and fail when the member is opened past a threshold distance.

For example, in some cases, a fork ring 68C will be desirably mounted on a motorcycle fork 56 having a two inch (2 in.) diameter. To place the fork ring 68C on the fork, the fork ring 68C must open to at least a diameter of two inches (2 in.). In cases where a fork ring 68C is unable to open to two inches (2 in.) (e.g., when the fork ring 68C is arranged as a "thick" band in one or more dimensions, when the fork ring 68C has a small diameter, or for other reasons), the opening threshold of the fork ring 68C will be exceeded, and the fork ring 68C will be damaged or destroyed, before the fork ring 68C can be mounted on the fork 56. Conversely, however, if the fork ring 68C has one or more flex structures as taught herein, the fork ring 68C will have a higher opening threshold that may allow placement of the fork ring 68C onto the motorcycle fork 56.

Figure 8A:
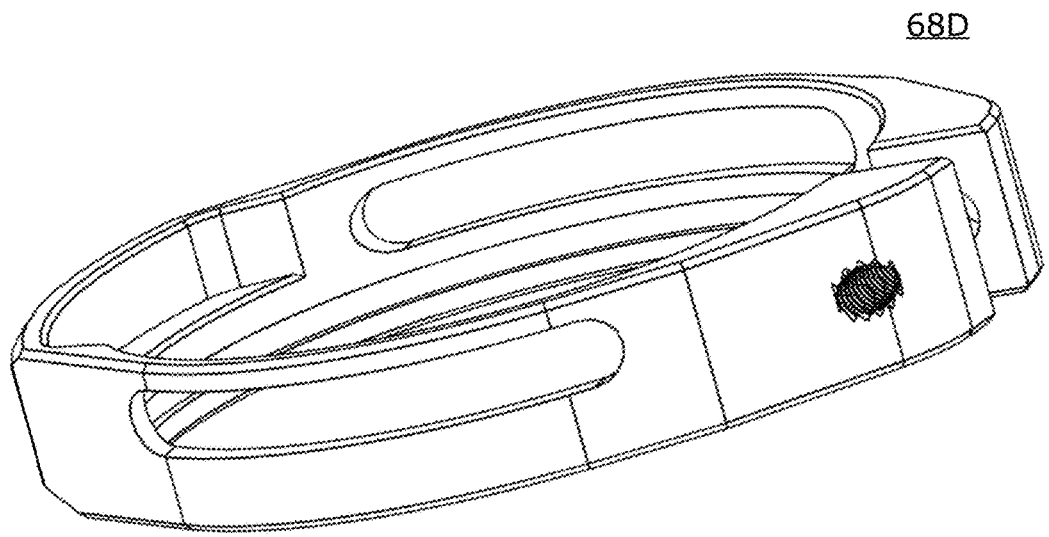
FIG. 8A is another top, front-side isometric view of an exemplary fork ring with a wear indicator.
Figure 8B:
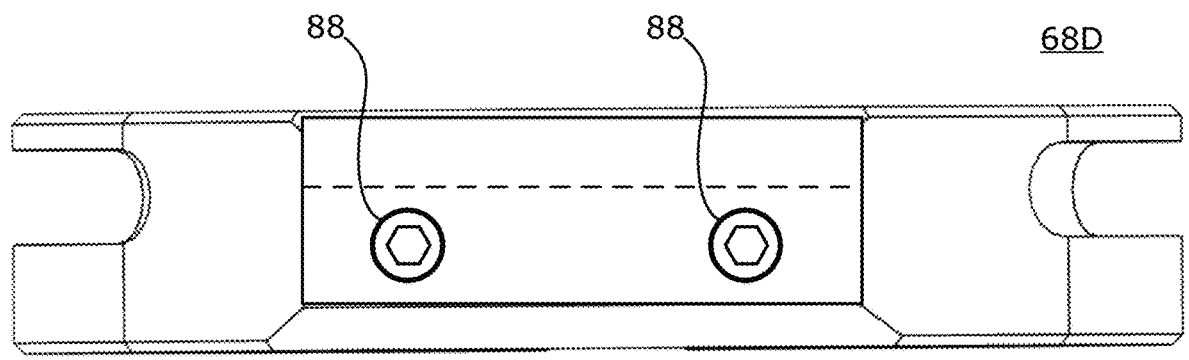
FIG. 8B is a front-side elevation view of the exemplary fork ring of FIG. 8A.

FIG. 8A is another top, front-side isometric view of an exemplary fork ring 68D with a wear indicator 88, and FIG. 8B is a front-side elevation view of the exemplary fork ring 68D of FIG. 8A. In the present disclosure, for brevity, certain sets of related figures may be referred to as a single, multi-part figure to facilitate a clearer understanding of the illustrated subject matter. For example, FIGS. 8A-8B may be individually or collectively referred to as FIG. 8. Structures earlier identified are not repeated for brevity.

In the embodiment of FIG. 8, the fork ring 68D includes two wear indicators 88. These wear indicators 88 in the present embodiment are arranged as small button head screws that are threaded into the face of the fork ring 68D. Other structures (e.g., screws or other threaded members, posts, pins, solder balls, epoxy, or some other suitably wear resistant material) are contemplated. Along the lines of the wear indicator structures of FIG. 7, the wear indicators 88 in FIG. 8 wear down as the fork ring 68D travels up and down proximate the fork guard 58.

Having now set forth certain embodiments, further clarification of certain terms used herein may be helpful to providing a more complete understanding of that which is considered inventive in the present disclosure.

Within the present disclosure, the word "proximate" is used to mean a suitable location near a particular point of interest. The suitable location may be within inches, within feet, or within some other suitable distance as the context requires. For example, a fork ring 68 placed on a motorcycle fork 56 proximate an improved suspension restraint device 10 may be sufficiently close that the forks of the motorcycle may be compressed enough to allow a latching pin 18 of the improved suspension restraint device 10 to engage with the fork ring 68.

As described herein, for simplicity, a motorcycle rider may in some cases be described in the context of the male gender. It is understood that a motorcycle rider can be of any gender, and the terms "he," "his," and the like as used herein are to be interpreted broadly inclusive of all known gender definitions. As the context may require in this disclosure, except as the context may dictate otherwise, the singular shall mean the plural and vice versa; all pronouns shall mean and include the person, entity, firm or corporation to which they relate; and the masculine shall mean the feminine and vice versa.

In the absence of any specific clarification related to its express use in a particular context, where the terms "substantial" or "about" in any grammatical form are used as modifiers in the present disclosure and any appended claims (e.g., to modify a structure, a dimension, a measurement, or some other characteristic), it is understood that the characteristic may vary by up to 30 percent. For example, hold down base 16 of an improved suspension restraint device 10 may be described as being mounted or otherwise oriented "substantially vertical." In these cases, a hold down base 16 that is oriented exactly vertical is oriented along a "Z" axis that is normal (i.e., 90 degrees or at right angle) to a plane formed by an "X" axis and a "Y" axis such as the ground. Different from the exact precision of the term, "vertical," the use of "substantially" to modify the characteristic permits a variance of the "vertical" characteristic by up to 30 percent. Accordingly, a hold down base 16 that is oriented "substantially vertical" includes hold down bases 16 oriented between 63 degrees and 117 degrees. A hold down base 16 that is oriented at 45 degrees of an X-Y plane, however, is not mounted "substantially vertical." As another example, a motorcycle front fork 56 having a particular linear range of motion of "between about four inches (4 in.) and ten inches (10 in.)" includes front forks 56 in which the linear dimension varies by up to 30 percent, Accordingly, the particular linear dimension of front fork's 56 range of motion may be between one inch (1 in.) and thirteen inches (13 in.).

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

The terms "include" and "comprise," as well as derivatives and variations thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present disclosure, the terms first, second, etc., may be used to describe various elements, however, these elements are not to be limited by these terms unless the context clearly requires such limitation. These terms are only used to distinguish one element from another. For example, a first machine could be termed a second machine, and, similarly, a second machine could be termed a first machine, without departing from the scope of the inventive concept.

The singular forms of "a," "an," and "the" in the present disclosure include plural referents unless the content and context clearly dictates otherwise. The conjunctive terms, "and" and "or," are generally employed in the broadest sense to include "and/or" unless the content and context clearly dictates inclusivity or exclusivity as the case may be. The composition of "and" and "or" when recited herein as "and/or" encompasses an embodiment that includes all of the elements associated thereto and at least one more alternative embodiment that includes fewer than all of the elements associated thereto.

In the present disclosure, conjunctive lists make use of a comma, which may be known as an Oxford comma, a Harvard comma, a serial comma, or another like term. Such lists are intended to connect words, clauses, or sentences such that the thing following the comma is also included in the list.

The headings and Abstract of the Disclosure provided herein are for convenience only and do not interpret the scope or meaning of the embodiments.

The various embodiments described above can be combined to provide further embodiments. Aspects of the embodiments can be modified, if necessary to employ concepts of the various patents, application and publications to provide yet further embodiments.

In the description herein, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order to avoid obscuring the description with unnecessary detail. Thus, the present disclosure is not intended to be limited to the embodiments shown but is instead to be accorded the widest scope consistent with the principles and features disclosed herein. Hence, these and other changes can be made to the embodiments in light of the above-detailed description. In general, in the following claims, the terms used should not be construed to limit the claims to the specific embodiments disclosed in the specification but should be construed to include all possible embodiments along with the full scope of equivalents to which such claims are entitled. Accordingly, the claims are not limited by the disclosure.

The invention claimed is:

1. An improved suspension restraint system to releasably lock a front fork of a motorcycle, comprising:
   a fork ring arranged to receive a latching pin when the fork ring is coupled or integrated with the front fork of the motorcycle;
   a hold down component including a hold down base and at least one latching pin received within the hold down base, the hold down base extending in a first direction; and
   a cross member united with the hold down component, the cross member extending in at least a second direction different than the first direction, the cross member and the hold down component configured to be further mounted to a fork guard of the motorcycle by a plurality of fasteners positioned at vertices of a separation of stress pattern that extends from a center point of the fork guard in the first and second directions, the cross member located proximate the at least one latching pin, a respective portion of the latching pin configured to selectably travel through the motorcycle fork guard and releasably lock into the fork ring.

2. The improved suspension restraint system of claim 1, wherein the at least one latching pin is a spring-loaded pin assembly.

3. The improved suspension restraint system of claim 1, wherein the separation of stress pattern is a triangular separation of stress pattern or a dual triangular separation of stress pattern.

4. The improved suspension restraint system of claim 1, wherein the fork ring comprises:
   a wear indicator.

5. The improved suspension restraint system of claim 4, wherein the wear indicator comprises:
   a colored finish;
   a wear indicator face; and
   a wear indicator groove.

6. The improved suspension restraint system of claim 4, wherein the wear indicator comprises:
   at least one threaded member.

7. The improved suspension restraint system of claim 1, wherein the fork ring comprises:

a shaped surface on at least a portion of its lower boundary.

8. The improved suspension restraint system of claim 1, wherein the fork ring comprises:
one or more flex structures arranged to increase an opening capacity of the fork ring.

9. The improved suspension restraint system of claim 1, wherein the cross member includes at least one concave surface.

10. The improved suspension restraint system of claim 1, wherein the cross member includes at least one binding profile.

11. An improved suspension restraint device to releasably lock a front fork of a motorcycle, comprising:
a hold down component including a hold down base and at least one latching pin received within the hold down base, the hold down base extending in a first direction; and
a cross member united with the hold down component, the cross member extending in at least a second direction different than the first direction, the cross member and the hold down component configured to be further mounted to a motorcycle fork guard by a plurality of fasteners positioned at vertices of a separation of stress pattern that extends from a center point of the fork guard in the first and second directions, the cross member located proximate the at least one latching pin, a respective portion of the latching pin configured to selectably travel through the motorcycle fork guard and releasably lock relative to the front fork of the motorcycle.

12. The improved suspension restraint device of claim 11, wherein the at least one latching pin is a spring-loaded pin assembly.

13. The improved suspension restraint device of claim 11, wherein the separation of stress pattern is a triangular separation of stress pattern or a dual triangular separation of stress pattern.

14. The improved suspension restraint device of claim 11, wherein the at least one latching pin has at least one gently shaped edge.

15. The improved suspension restraint device of claim 11, wherein the at least one latching pin is exactly one latching pin.

16. An improved motorcycle suspension restraint method, comprising:
compressing a motorcycle's front forks down a path of travel by a first amount, the motorcycle's front forks bearing a fork ring arranged to receive a latching pin, the first amount being sufficient to advance the fork ring below the latching pin;
advancing the latching pin at least partially into the path of travel, wherein the latching pin is contained in a hold down base of an improved suspension restraint device, the hold down base extending in a first direction, the improved suspension restraint device further having a cross member united with the hold down component, the cross member extending in at least a second direction different than the first direction;
releasing the motorcycle's front forks up the path of travel less than the first amount until at least a portion of the latching pin is temporarily held in place by at least a portion of the fork ring; and
sustaining pressure in a fork guard from tension caused by the latching pin being temporarily held in place, the ability to sustain the pressure being enabled at least in part by a plurality of fasteners positioned at vertices of a separation of stress pattern that extends from a center point of the fork guard in the first and second directions, wherein the cross member and the hold down component are mounted to the fork guard of the motorcycle by the plurality of fasteners.

17. The improved motorcycle suspension restraint method of claim 16 wherein the separation of stress pattern is a triangular separation of stress pattern or a dual triangular separation of stress pattern.

18. The improved motorcycle suspension restraint method of claim 16, further comprising:
accelerating the motorcycle in a condition that would cause a wheelie but for the latching pin being temporarily held in place by at least the portion of the fork ring hold down component; and
decelerating the motorcycle sufficiently to cause a compression in the front forks down the path of travel by a second amount, the second amount being sufficient to permit retraction of the latching pin out from the path of travel.

19. The improved motorcycle suspension restraint method of claim 18, further comprising:
operating the motorcycle until a wear indicator on the fork ring indicates the fork ring is worn out or nearing a failure point.

20. The improved motorcycle suspension restraint method of claim 16, further comprising:
accelerating the motorcycle in a condition that would cause a wheelie but for the latching pin being temporarily held in place by at least the portion of the fork ring hold down component;
selecting whether to compress the motorcycle's front forks down the path of travel by the first amount or a second amount; and
based on the selection, advancing either the latching pin or a second latching pin into the path of travel.

* * * * *